US011393226B2

(12) United States Patent
Yamataka et al.

(10) Patent No.: US 11,393,226 B2
(45) Date of Patent: Jul. 19, 2022

(54) EMOTION ESTIMATION DEVICE

(71) Applicant: DENSO CORPORATION, Kariya (JP)

(72) Inventors: Minori Yamataka, Kariya (JP); Fumika Nakanishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/943,073

(22) Filed: Jul. 30, 2020

(65) Prior Publication Data

US 2021/0034891 A1 Feb. 4, 2021

(30) Foreign Application Priority Data

Aug. 1, 2019 (JP) .............................. JP2019-142532

(51) Int. Cl.
*G06V 40/16* (2022.01)
*G06V 20/59* (2022.01)
*B60W 40/04* (2006.01)
*B60W 40/09* (2012.01)

(52) U.S. Cl.
CPC ........... *G06V 20/597* (2022.01); *B60W 40/04* (2013.01); *B60W 40/09* (2013.01); *G06V 40/16* (2022.01); *G06V 40/168* (2022.01); *G06V 40/176* (2022.01); *B60W 2540/229* (2020.02); *B60W 2540/30* (2013.01); *B60W 2554/406* (2020.02)

(58) Field of Classification Search
CPC ........... G06K 9/00315; G06K 9/00302; G06K 9/00845; G06K 9/00268; G06K 9/00275; G06K 9/00281
See application file for complete search history.

(56) References Cited

U.S. PATENT DOCUMENTS

| 10,043,063 | B1 | 8/2018 | Perfido et al. | |
|---|---|---|---|---|
| 2008/0238694 | A1 | 10/2008 | Ishida | |
| 2009/0285456 | A1 | 11/2009 | Moon et al. | |
| 2009/0312998 | A1* | 12/2009 | Berckmans | G16H 50/50 703/11 |
| 2017/0311863 | A1* | 11/2017 | Matsunaga | A61B 5/163 |
| 2019/0023208 | A1* | 1/2019 | Boston | B60R 21/0134 |
| 2019/0193753 | A1* | 6/2019 | Kapuria | G08G 1/165 |

* cited by examiner

*Primary Examiner* — Benyam Haile
(74) *Attorney, Agent, or Firm* — Maschoff Brennan

(57) ABSTRACT

An emotion estimation device includes: an emotion estimation unit estimating a user emotion as an emotion associated with an index value of a facial expression of a user between (i.e., involving/during a period having) a plurality of consecutive events, based on a correspondence between (A) the index value which is at least one of (i) a facial expression score of (i.e., representing) the facial expression of the user and (ii) a feature amount about a change of such facial expression score and (B) the facial expression of the user correlated with the plurality of consecutive events.

11 Claims, 17 Drawing Sheets

FIG. 4

| USER ID | PREC EVNT | SUBSQ EVNT | NEUTRAL SCORE MAX | NEUTRAL SCORE MIN | NEUTRAL C AMT | NEUTRAL C TM | ANGER SCORE MAX | ANGER SCORE MIN | ANGER C AMT | ANGER C TM | FEAR SCORE MAX | FEAR SCORE MIN | FEAR C AMT | FEAR C TM | SURPRISE SCORE MAX | SURPRISE SCORE MIN | SURPRISE C AMT | SURPRISE C TM |
|---|---|---|---|---|---|---|---|---|---|---|---|---|---|---|---|---|---|---|
| USER A | STP BRK | STP ACC | 90 | 20 | -70 | 1 | 60 | 0 | 60 | 2 | 10 | 0 | 10 | 1 | 10 | 0 | 10 | 1 |
|  |  | INC OF HR/HF INTEG | 90 | 20 | -70 | 1 | 60 | 0 | 60 | 2 | 10 | 0 | 10 | 1 | 10 | 0 | 10 | 1 |
|  | CGSTN | STP ACC | 90 | 20 | -70 | 1 | 40 | 0 | 40 | 2 | 0 | 0 | 0 | 1 | 0 | 0 | 0 | 0 |
|  |  | STP BRK | 90 | 20 | -70 | 1 | 40 | 0 | 40 | 2 | 0 | 0 | 0 | 1 | 0 | 0 | 0 | 0 |
|  |  | INC OF HR/HF INTEG | 90 | 20 | -70 | 1 | 40 | 0 | 40 | 2 | 0 | 0 | 0 | 1 | 0 | 0 | 0 | 0 |
|  | CUT IN | STP ACC | 90 | 20 | -70 | 1 | 70 | 0 | 70 | 2 | 10 | 0 | 10 | 1 | 10 | 0 | 10 | 1 |
|  |  | INC OF HR/HF INTEG | 90 | 20 | -70 | 1 | 70 | 0 | 70 | 2 | 10 | 0 | 10 | 1 | 10 | 0 | 10 | 1 |
|  | INC OF HR/LF INTEG | STP ACC | 90 | 20 | -70 | 1 | 70 | 0 | 70 | 2 | 10 | 0 | 10 | 1 | 10 | 0 | 10 | 1 |
|  |  | DEC OF INT-V DIST | 90 | 20 | -70 | 1 | 60 | 0 | 60 | 2 | 10 | 0 | 10 | 1 | 10 | 0 | 10 | 1 |
|  | BOARDING | ENGINE START | 90 | 80 | 10 | 1 | 0 | 0 | 0 | 0 | 0 | 0 | 0 | 0 | 0 | 0 | 0 | 0 |
| USER B | STP BRK | INC OF HR/HF INTEG | 80 | 70 | -10 | 1 | 0 | 0 | 0 | 0 | 10 | 0 | 10 | 1 | 20 | 0 | 20 | 1 |

FIG. 5

| USER ID | PREC EVNT | SUBSQ EVNT | FACIAL EXPRESSION ||||||||||||
|---|---|---|---|---|---|---|---|---|---|---|---|---|---|
| | | | JOY |||| SORROW |||| DISPLS ||||
| | | | SCORE || C AMT | C TM | SCORE || C AMT | C TM | SCORE || C AMT | C TM |
| | | | MAX | MIN | | | MAX | MIN | | | MAX | MIN | | |
| USER A | STP BRK | STP ACC | 10 | 0 | -10 | 1 | 0 | 0 | 0 | 0 | 10 | 0 | 10 | 2 |
| | | INC OF HR/LF INTEG | 10 | 0 | -10 | 1 | 0 | 0 | 0 | 0 | 10 | 0 | 10 | 2 |
| | CGSTN | STP ACC | 10 | 0 | -10 | 1 | 0 | 0 | 0 | 0 | 60 | 0 | 60 | 2 |
| | | STP BRK | 10 | 0 | -10 | 1 | 0 | 0 | 0 | 0 | 60 | 0 | 60 | 2 |
| | | INC OF HR/LF INTEG | 10 | 0 | -10 | 1 | 0 | 0 | 0 | 0 | 60 | 0 | 60 | 2 |
| | CUT IN | STP ACC | 10 | 0 | -10 | 1 | 0 | 0 | 0 | 0 | 10 | 0 | 10 | 2 |
| | | INC OF HR/LF INTEG | 10 | 0 | -10 | 1 | 0 | 0 | 0 | 0 | 10 | 0 | 10 | 2 |
| | INC OF HR/LF INTEG | STP ACC | 10 | 0 | -10 | 1 | 0 | 0 | 0 | 0 | 10 | 0 | 10 | 2 |
| | | DEC OF INT-V DIST | 10 | 0 | -10 | 1 | 0 | 0 | 0 | 0 | 10 | 0 | 10 | 2 |
| | BOARDING | ENGINE START | 0 | 0 | 0 | 0 | 0 | 0 | 0 | 0 | 10 | 0 | 10 | 2 |
| USER B | STP BRK | INC OF HR/HF INTEG | 20 | 1 | -20 | 0 | 0 | 0 | 0 | 0 | 20 | 10 | 10 | 2 |
| | ... | ... | | | | | | | | | 0 | 0 | 0 | 0 |

FIG. 6

| PREC EVNT | SUBSQ EVNT | FACIAL EXPRESSION ||||||||||||| EMO |
|---|---|---|---|---|---|---|---|---|---|---|---|---|---|---|
| | | NEUTRAL ||| ANGER ||| FEAR ||| SURPRISE ||| |
| | | SCORE (MAX/MIN) | C AMT (MAX/MIN) | C TM (MAX/MIN) | SCORE (MAX/MIN) | C AMT (MAX/MIN) | C TM (MAX/MIN) | SCORE (MAX/MIN) | C AMT (MAX/MIN) | C TM (MAX/MIN) | SCORE (MAX/MIN) | C AMT (MAX/MIN) | C TM (MAX/MIN) | |
| BOARDING | ENGINE START | 90/80 | 10/-10 | 2/1 | 0/0 | 0/0 | 0/0 | 0/0 | 0/0 | 0/0 | 0/0 | 0/0 | 0/0 | NEUT |
| CGSTN | STP ACC | 90/20 | -50/-70 | 2/1 | 40/0 | 40/30 | 2/1 | 0/0 | 0/0 | 0/0 | 0/0 | 0/0 | 0/0 | IRRI |
| | STP BRK | 90/20 | -50/-70 | 2/1 | 40/0 | 40/30 | 2/1 | 0/0 | 0/0 | 0/0 | 0/0 | 0/0 | 0/0 | |
| | INC OF HR/LF INTEG | 90/20 | -50/-70 | 2/1 | 40/0 | 40/30 | 2/1 | 0/0 | 0/0 | 0/0 | 0/0 | 0/0 | 0/0 | |
| ... | ... | ... | ... | ... | ... | ... | ... | ... | ... | ... | ... | ... | ... | ... |
| CUT IN | STP ACC | 90/20 | -50/-70 | 2/1 | 70/0 | 70/60 | 2/1 | 10/0 | 0/0 | 0/0 | 10/0 | 10/0 | 2/1 | ANG |
| | INC OF HR/LF INTEG | 90/20 | -50/-70 | 2/1 | 70/0 | 70/60 | 2/1 | 10/0 | 0/0 | 0/0 | 10/0 | 10/0 | 2/1 | |
| STP BRK | STP ACC | 90/20 | -50/-70 | 2/1 | 70/0 | 70/60 | 2/1 | 10/0 | 0/0 | 0/0 | 10/0 | 10/0 | 2/1 | |
| | INC OF HR/LF INTEG | 90/20 | -50/-70 | 2/1 | 70/0 | 70/60 | 2/1 | 10/0 | 0/0 | 0/0 | 10/0 | 10/0 | 2/1 | |
| INC OF HR/LF INTEG | STP ACC | 90/20 | -50/-70 | 2/1 | 70/0 | 70/60 | 2/1 | 10/0 | 0/0 | 0/0 | 10/0 | 10/0 | 2/1 | |
| | DEC OF INT-V DIST | 90/20 | -50/-70 | 2/1 | 0/0 | 0/0 | 0/0 | 0/0 | 0/0 | 0/0 | 10/0 | 10/0 | 2/1 | |
| ... | ... | ... | ... | ... | ... | ... | ... | ... | ... | ... | ... | ... | ... | ... |
| STP BRK | INC OF HR/HF INTEG | 90/70 | -10/-20 | 2/1 | 0/0 | 0/0 | 0/0 | 0/0 | 0/0 | 0/0 | 30/0 | 30/20 | 2/1 | COMF |
| ... | | ... | ... | ... | ... | ... | ... | ... | ... | ... | ... | ... | ... | ... |

FIG. 7

| PREC EVNT | SUBSQ EVNT | FACIAL EXPRESSION |  |  |  |  |  |  |  |  |  |  |  |  |  |  |  |  |  | EMO |
|---|---|---|---|---|---|---|---|---|---|---|---|---|---|---|---|---|---|---|---|---|
|  |  | JOY |  |  |  |  |  |  | SORROW |  |  |  |  |  | DISPLS |  |  |  |  |  |
|  |  | SCORE |  | C AMT |  | C TM |  | SCORE |  | C AMT |  | C TM |  | SCORE |  | C AMT |  | C TM |  |  |
|  |  | MAX | MIN | MAX | MIN | MAX | MIN | MAX | MIN | MAX | MIN | MAX | MIN | MAX | MIN | MAX | MIN | MAX | MIN |  |
| BOARDING | ENGINE START | 0 | 0 | 0 | 0 | 0 | 0 | 0 | 0 | 0 | 0 | 0 | 0 | 0 | 0 | 0 | 0 | 0 | 0 | NEUT |
| CGSTN | STP ACC | 10 | 0 | 10 | 5 | 2 | 1 | 0 | 0 | 0 | 0 | 0 | 0 | 60 | 0 | 60 | 50 | 2 | 1 | IRRI |
|  | STP BRK | 10 | 0 | 10 | 5 | 2 | 1 | 0 | 0 | 0 | 0 | 0 | 0 | 60 | 0 | 60 | 50 | 2 | 1 |  |
|  | INC OF HR/LF INTEG | 10 | 0 | 10 | 5 | 2 | 1 | 0 | 0 | 0 | 0 | 0 | 0 | 60 | 0 | 60 | 50 | 2 | 1 |  |
|  | ... | ... | ... | ... | ... | ... | ... | ... | ... | ... | ... | ... | ... | ... | ... | ... | ... | ... | ... |  |
| CUT IN | STP ACC | 10 | 0 | 0 | −10 | 2 | 1 | 0 | 0 | 0 | 0 | 0 | 0 | 10 | 0 | 10 | 5 | 2 | 1 | ANG |
|  | INC OF HR/LF INTEG | 10 | 0 | 0 | −10 | 2 | 1 | 0 | 0 | 0 | 0 | 0 | 0 | 10 | 0 | 10 | 5 | 2 | 1 |  |
| STP BRK | STP ACC | 10 | 0 | 0 | −10 | 2 | 1 | 0 | 0 | 0 | 0 | 0 | 0 | 10 | 0 | 10 | 5 | 2 | 1 |  |
|  | INC OF HR/LF INTEG | 10 | 0 | 0 | −10 | 2 | 1 | 0 | 0 | 0 | 0 | 0 | 0 | 10 | 0 | 10 | 5 | 2 | 1 |  |
| INC OF HR/LF INTEG | STP ACC | 10 | 0 | 0 | −10 | 2 | 1 | 0 | 0 | 0 | 0 | 0 | 0 | 10 | 0 | 10 | 5 | 2 | 1 |  |
|  | DEC OF INT-V DIST | 10 | 0 | −5 | −10 | 2 | 1 | 0 | 0 | 0 | 0 | 0 | 0 | 10 | 0 | 10 | 5 | 2 | 1 |  |
|  | ... | ... | ... | ... | ... | ... | ... | ... | ... | ... | ... | ... | ... | ... | ... | ... | ... | ... | ... |  |
| STP BRK | INC OF HR/HF INTEG | 10 | 0 | −10 | ... | ... | ... | 0 | 0 | 0 | 0 | 0 | 0 | 0 | 0 | 0 | 0 | 0 | 0 | COMF |
|  | ... | ... | ... | ... | ... | ... | ... | ... | ... | ... | ... | ... | ... | ... | ... | ... | ... | ... | ... | ... |
|  |  | ... | ... | ... | ... | ... | ... | ... | ... | ... | ... | ... | ... | ... | ... | ... | ... | ... | ... | ... |

FIG. 13

| PREC EVNT | SUBSQ EVNT | EMOTION |
|---|---|---|
| BOARDING | ENGINE START | NEUTRAL |
| CONGESTION | STEEP ACCELERATION | IRRITATION |
| | STEEP BREAKING | |
| | INCREASE OF HR/LF INTEG | |
| CUT IN | STEEP ACCELERATION | ANGER |
| | INCREASE OF HR/LF INTEG | |
| STEEP BREAKING | STEEP ACCELERATION | |
| | INCREASE OF HR/LF INTEG | |
| INCREASE OF HR/LF INTEG | STEEP ACCELERATION | |
| | DECREASE OF INT-V DIST | |
| STEEP BREAKING | INCREASE OF HR/HF INTEG | OMFORT |

EMOTION ESTIMATION DEVICE

CROSS REFERENCE TO RELATED APPLICATION

The present application is based on and claims the benefit of priority of Japanese Patent Application No. 2019-142532, filed on Aug. 1, 2019, the disclosure of which is incorporated herein by reference.

TECHNICAL FIELD

The present disclosure generally relates to an emotion estimation device that estimates a user's emotion.

BACKGROUND INFORMATION

Conventionally, a method of estimating a user's emotion using a facial expression score, which is based on plural kinds of facial expression of the user respectively quantified as a score, has been proposed.

SUMMARY

It is an object of the present disclosure to provide an emotion estimation device that is capable of improving the estimation accuracy of a user's emotion.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram of an example of an accumulated data table according to the first embodiment;

FIG. 5 is a diagram of another example of the accumulated data table according to the first embodiment;

FIG. 6 is a diagram of an example of an emotion estimation table according to the first embodiment;

FIG. 7 is a diagram of another example of the emotion estimation table according to the first embodiment;

FIG. 13 is a diagram of a correlation between two consecutive events and a user emotion;

DETAILED DESCRIPTION

First Embodiment

Figure 1:
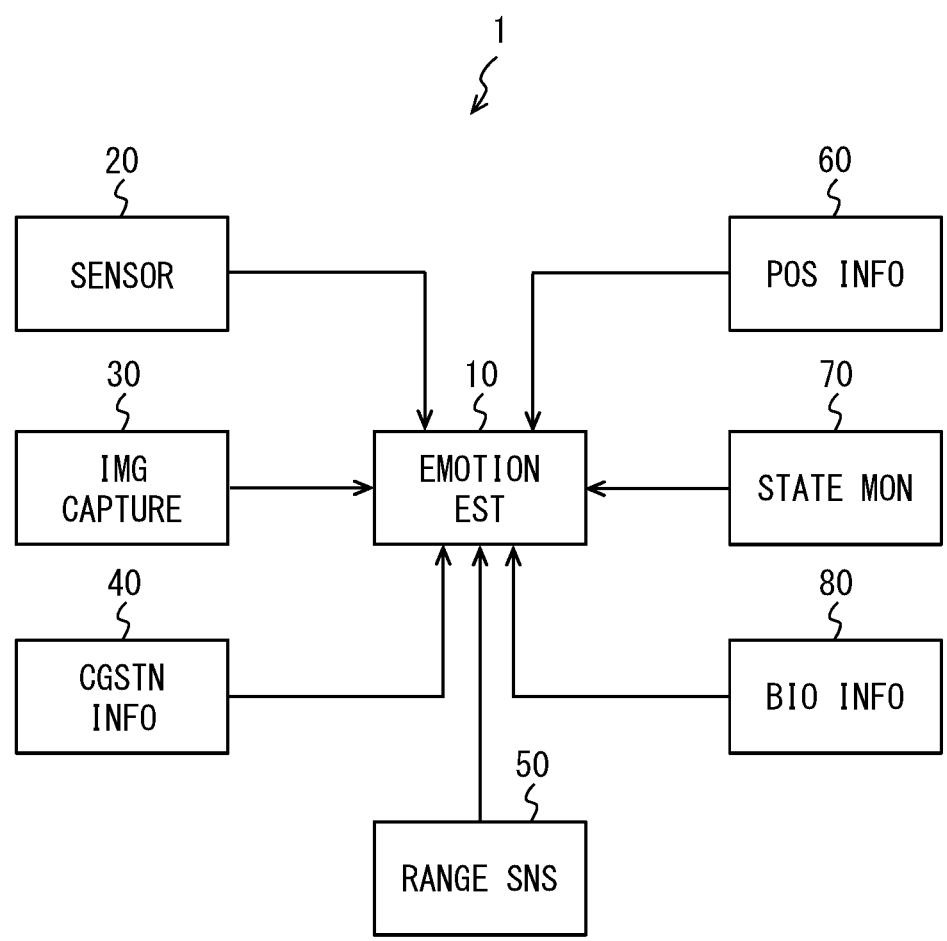
FIG. 1 is a diagram of an emotion estimation system according to a first embodiment of the present disclosure.

Hereinafter, a first embodiment of the present disclosure is described with reference to the drawings. As shown in FIG. 1, an emotion estimation system 1 according to the first embodiment includes an emotion estimation device 10, a sensor 20, an image capture device 30, a congestion information acquisition device 40, a range sensor 50, a position information acquisition device 60, a state monitoring device 70, and a biometric information acquisition device 80.

The emotion estimation device 10 is a device that estimates an emotion of a user who is the subject of emotion estimation. The emotion estimation device 10 includes a microcontroller, various electronic circuits, and a communication interface.

The microcontroller is a device that controls the operation of the emotion estimation device 10, and includes a calculation device, a volatile storage device, and a non-volatile storage device. The calculation device is a device such as a CPU or a GPU capable of executing various programs. The calculation device executes an emotion estimation method of the present disclosure by executing a program stored in a non-volatile storage device.

The communication interface in an interface for sending and receiving various kinds of data among the sensor 20, the image capture device 30, the congestion information acquisition device 40, the range sensor 50, the position information acquisition device 60, the state monitoring device 70, and the biometric information acquisition device 80.

The sensor 20 is a detection device that detects various operations performed by the user on a vehicle and transmits a signal or signals indicating the operations via an in-vehicle LAN (Local Area Network). Specific examples of the sensor 20 include a sensor that detects a start of a vehicle drive source (that is, an engine and a motor, etc.), a sensor that detects an operation amount of an accelerator pedal, a sensor that detects an operation amount of a brake pedal, a sensor that detects an amount of a steering operation, and the like. The sensor 20 sends control signals to an in-vehicle LAN (Local Area Network), including a control signal for instructing the start of the drive source, a control signal for instructing an acceleration and the operation amount of the vehicle, a control signal for instructing a brake and its operation amount, a control signal instructing the operation and the operation amount of a steering wheel, and the like, respectively according to the operation of the user.

The image capture device 30 is a device that captures an image of a surrounding environment of the vehicle on which the user is boarding. When the image capture device 30 capture an image of the surrounding environment of the vehicle and generates a capture image, the image capture device 30 provides the capture image to the emotion estimation device 10.

The congestion information acquisition device 40 is a device that acquires traffic congestion information of a traveling lane of the vehicle on which the user is boarding/boarding. The congestion information acquisition device 40 can acquire traffic congestion information from a traffic congestion information providing device installed on a road or on a road side, for example, via wireless communication. When the congestion information acquisition device 40 acquires the congestion information, the congestion information acquisition device 40 provides the congestion information to the emotion estimation device 10.

The range sensor 50 is a device that measures an inter-vehicle distance between a vehicle on which the user is boarding and a vehicle in front of such vehicle (i.e., a preceding vehicle). The range sensor 50 is installed in the vehicle on which the user is boarding. The range sensor 50 can measure an inter-vehicle distance to a vehicle in front by emitting an exploratory wave such as infrared rays or millimeter waves and analyzing a reflected wave. When the range sensor 50 measures the inter-vehicle distance to the preceding vehicle, the range sensor 50 provides the emotion estimation device 10 with information indicating the inter-vehicle distance.

The position information acquisition device 60 is a device that calculates position information of the vehicle on which the user is boarding. The position information acquisition device 60 can calculate a current position of the vehicle based on positioning signals provided by a plurality of positioning satellites of a GNSS (Global Navigation Satellite System). The position information acquisition device 60 provides the emotion estimation device 10 with current position information indicating the current position of the vehicle.

The state monitoring device 70 is a device that captures an image of a face of the user and analyzes the capture image. The state monitoring device 70 is installed at a position where the user's face can be captured while the user is seated in a driver's seat. When the state monitoring device 70 captures a user image and generates a capture image, the state monitoring device 70 provides the capture image to the emotion estimation device 10.

Further, the state monitoring device 70 can identify a user by matching the capture image with a capture image of the user acquired in advance. The state monitoring device 70 sends identification information of the identified user to the emotion estimation device 10.

Further, the state monitoring device 70 compares a capture image of a vacant driver's seat (referred to as a "reference image" or a "vacant seat image") with the current capture image, and, when these images are different from each other, the state monitoring device 70 sends an event indicating that the user is seated in the driver's seat to the emotion estimation device 10.

Further, the state monitoring device 70 can analyze the capture image and calculate an eyelid opening degree of the user. The state monitoring device 70 sends information indicating the user's eyelid opening degree to the emotion estimation device 10.

Further, the state monitoring device 70 analyzes the capture image to determine whether or not a mouth of the user is opened and closed, and when the mouth of the user is opened and closed, the state monitoring device 70 sends an event indicating that the mouth of the user is opened and closed to the emotion estimation device 10.

The biometric information acquisition device 80 is a device that acquires biometric information. As a specific example of the biometric information acquisition device 80, a wearable device or the like that can be worn by a user can be given. For example, the biometric information acquisition device 80 acquires a pulse wave indicating a change in blood flow or a change in blood vessel volume caused by the pulsation of the user's heart, and provides the emotion estimation device 10 with a pulse wave signal indicating the pulse wave.

Figure 2:
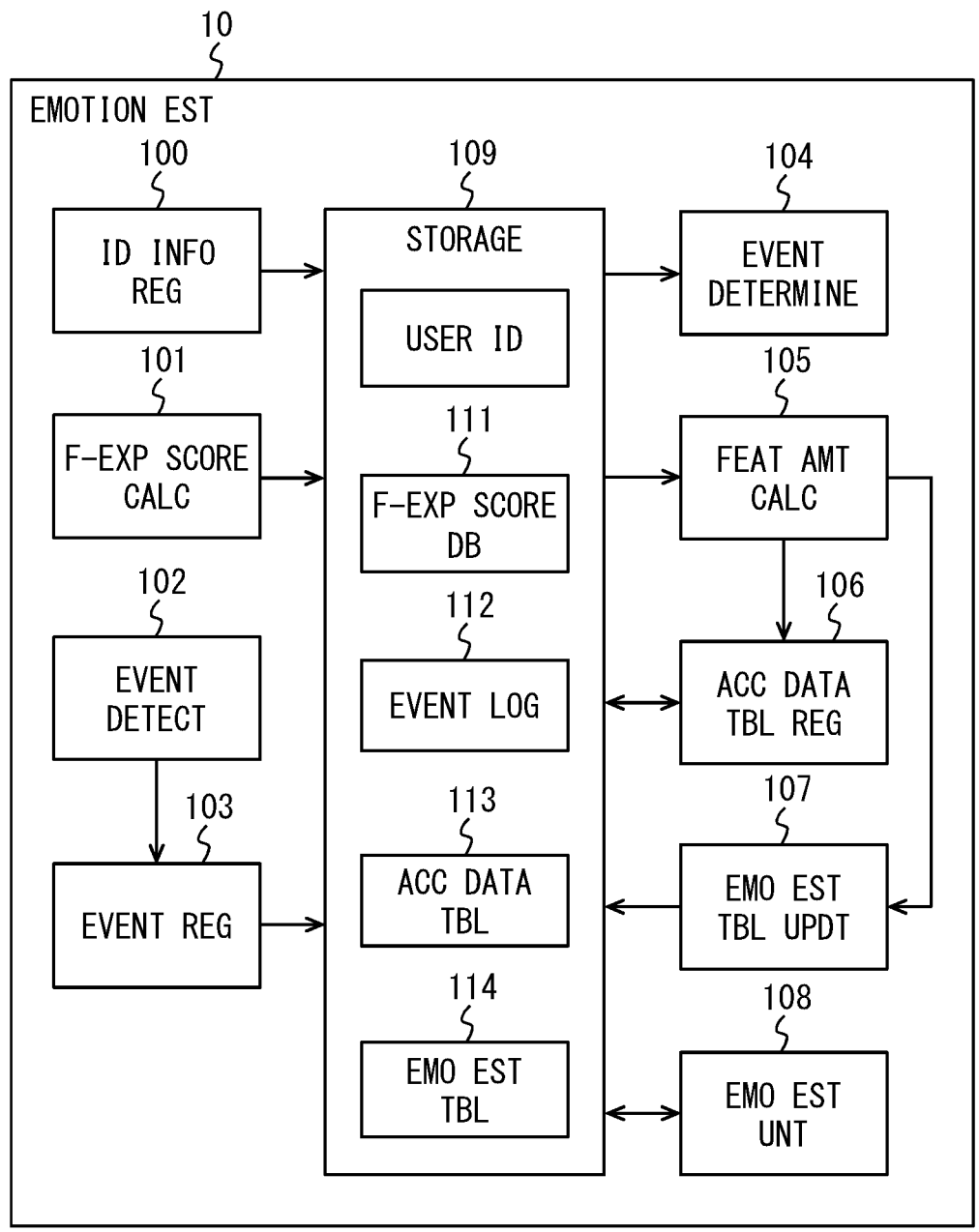
FIG. 2 is a diagram of a configuration of an emotion estimation device according to the first embodiment.

Next, the function of the emotion estimation device 10 is described with reference to FIG. 2. The emotion estimation device 10 includes an identification information registration unit 100, a facial expression score calculation unit 101, an event detection unit 102, an event registration unit 103, an event determination unit 104, a feature amount calculation unit 105, and an accumulated data table registration unit 106, an emotion estimation table update unit 107, an emotion estimation unit 108, and a storage device 109.

The identification information registration unit 100 is a functional unit that registers identification information of the user. When the identification information registration unit 100 receives the identification information of the user from the state monitoring device 70, the identification information registration unit 100 stores the identification information in the storage device 109.

The facial expression score calculation unit 101 is a functional unit that calculates a facial expression score of the user from the capture image provided by the state monitoring device 70 and registers it in a facial expression score database 111 in the storage device 109. For example, as the facial expression represented by the facial expression score, seven types of Paul Ekman's facial expressions, that is, neutral, anger, fear, surprise, joy, sorrow, and displeasure adoptable.

More specifically, the facial expression score calculation unit 101 calculates a feature amount related to a relative position or shape of a facial part based on position information of the facial part of the user. As the feature amount, a Haar-like feature amount, a feature point distance, a Fourier descriptor, etc. can be used. Next, the facial expression score calculation unit 101 inputs the calculated feature amount into a facial expression score calculation model (not shown) for each of various facial expressions, and acquires the facial expression score for each of the various facial expressions from these facial expression score calculation model. The facial expression score calculation model can be learned/trained by using face images of many people based on various machine learning algorithms.

Then, the facial expression score calculation unit 101 calculates the facial expression score so that the total of the facial expression scores of the facial expressions output by the facial expression score calculation model becomes 100. The facial expression score calculation unit 101 registers the facial expression score of the user thus calculated and a generation time of the facial expression score in the facial expression score database 111 in association with each other.

The event detection unit 102 is a functional unit that detects an event related to the user. The event includes a specific event that may reduce an accuracy of the user's emotion estimation and a normal event other than the specific event. The specific event is, for example, an event indicating the user's drowsiness (hereinafter, referred to as "drowsiness event"), an event indicating that the user is involved in a conversation with other person(s) (hereinafter, referred to as "conversation event"), and the like.

The normal events include (1) an event caused by or involving the user and (2) an event related to the surrounding environment of the user. The event caused by the user includes an event caused by the operation of the vehicle on which the user is boarding, an event caused by the state of the user, and the like.

The event caused by the operation of the vehicle includes an event indicating the start of the drive source of the vehicle, an event indicating a steep acceleration of the vehicle, an event indicating a steep braking, an event indicating a steep steering, and the like. The event detection unit 102 monitors control signals sent by the sensor 20, and when detecting the control signals related to these events, the event detection unit 102 can determine that such an event has occurred.

Further, the event caused by the operation of the vehicle includes an event indicating a rapid decrease of an inter-vehicle distance between the user's vehicle and the preceding vehicle. The event detection unit 102 can determine that an event indicating a rapid decrease of the inter-vehicle distance has occurred when a rate of decrease of the inter-vehicle distance from the preceding vehicle provided by the range sensor 50 is equal to or greater than a predetermined threshold value, which is indicative of the rapid decrease of the inter-vehicle distance.

The events caused by the state of the user include an event indicating an increase or decrease of heart rate, an event indicating an increase or decrease of an LF integrated value that is an integrated value of a low frequency component based on heart rate variability, and an event indicating an increase or decrease of an HF integrated value that is an integrated value of a high frequency component based on heart rate variability.

The event detection unit 102 uses the pulse wave signal provided by the biometric information acquisition device 80 to count the heart rate in a plurality of periods and compare heart rates. The event detection unit 102 can determine that an event indicating an increase of the heart rate has occurred when an increase rate of the heart rate is equal to or higher than a predetermined threshold value. The threshold value can be an increase rate of the heart rate caused by the change in the emotion of the user.

Further, the event detecting unit 102 can determine that an event indicating a decrease of the heart rate has occurred when the rate of decrease of the heart rate is equal to or higher than a predetermined threshold value. The threshold value can be a rate of decrease of heart rate caused by a change in the emotion of the user.

Further, the event detection unit 102 uses the pulse wave signal to calculate the heartbeat interval in a predetermined period (for example, 1 minute). Then, the event detecting unit 102 can calculate the LF integrated value and the HF integrated value by performing a fast Fourier transform on the calculated heartbeat interval and integrating the LF component and the HF component of the acquired frequency data. The event detection unit 102 calculates an LF integrated value and an HF integrated value for a plurality of periods, and the even detection unit 102 can determine whether or not an event indicating an increase or a decrease of the LF integrated value and the HF integrated value has occurred by comparing the LF integrated value and the HF integrated value.

More specifically, the event detection unit 102 can determine that an event indicating an increase of the LF integrated value has occurred when the increase rate of the LF integrated value is equal to or greater than a predetermined threshold value. The threshold value in such case can be an increase rate of the LF integrated value caused by a change in the emotion of the user.

Further, the event detecting unit 102 can determine that an event indicating a decrease of the LF integrated value has occurred when the decrease rate of the LF integrated value is equal to or greater than a predetermined threshold value. The threshold value in such case can be a decrease rate of the LF integrated value caused by a change in the emotion of the user.

Further, the event detection unit 102 can determine that an event indicating an increase of the HF integrated value has occurred when the increase rate of the HF integrated value is equal to or greater than a predetermined threshold value. The threshold value in such case can be an increase rate of the HF integrated value caused by a change in the emotion of the user.

Further, the event detection unit 102 can determine that an event indicating a decrease of the HF integrated value has occurred when the decrease rate of the HF integrated value is equal to or greater than a predetermined threshold value. The threshold value in such case can be a decrease rate of the HF integrated value caused by a change in the emotion of the user.

Further, the events caused by the state of the user include an event indicating that the user gets in the driver's seat, a drowsiness event, a conversation event, and the like.

For example, when the event detection unit 102 receives an event indicating that the user gets in the driver's seat from the state monitoring device 70, the event detection unit 102 can determine that an event indicating that the user has boarded has occurred.

Further, when the event detection unit 102 analyzes the information indicating the user's eyelid opening degree provided by the state monitoring device 70 and the analysis indicates that the user's eyelid opening degree is equal to or less than a predetermined threshold value (for example, 50%) for a predetermined period (for example, 30 seconds), it can be determined that a drowsiness event has occurred.

Further, when the event detection unit 102 counts the number of receptions of the event indicating that the mouth of the user has been opened and closed from the state monitoring device 70 and the number of receptions of such event in a predetermined period (for example, 10 seconds) exceeds a predetermined threshold value (for example, 10 times), it can be determined that a conversation event has occurred.

The event relating to the surrounding environment of the user includes an event indicating an increase of traffic volume around the user's vehicle, an event indicating traffic congestion around the user's vehicle, an event indicating interruption (i.e., cut-in) by other vehicle, and the like. The event detection unit 102 can analyze the capture images provided by the image capture device 30 and determine whether or not these events have occurred.

Further, the event related to the user's surrounding environment includes an event indicating that the user's vehicle is located near a merge point or a branch point of vehicle lanes. The event detection unit 102 analyzes the current position information provided by the position information acquisition device 60 and the position information of the merge point or the branch point stored in the storage device 109 in advance, and determines whether or not such an event has occurred.

The event registration unit 103 is a functional unit that registers various events detected by the event detection unit 102 in an event log 112 in the storage device 109. The event registration unit 103 registers an occurrence time of the event and information indicating the type of the event in association with each other.

The event determination unit 104 is a functional unit that refers to the event log 112 in the storage device 109 and determines whether or not a specific event that may reduce the accuracy of the emotion estimation of the user has occurred. For example, when the user is drowsy, the facial expression score may not be calculated accurately because the eyelid opening degree of the user may possibly be decreasing. Also, when the user is having a conversation, the facial expression score may not be calculated accurately because the user's mouth is open. Therefore, when a drowsiness event or a conversation event occurs, the facial expression score may not be accurately calculated, and the accuracy of the user's emotion estimation may possibly be reduced.

The feature amount calculation unit 105 is a functional unit that calculates the feature amount of the facial expression score using the facial expression score of each of the facial expressions of the user registered in the facial expression score database 111 in the storage device 109. In the present embodiment, the feature amount calculation unit 105 can calculate the change amount and change time of the facial expression score as the feature amount for seven types of the facial expressions. The feature amount calculation unit 105 may calculate a change tendency based on the change amount and the change time of the facial expression score as the feature amount.

Figure 3:
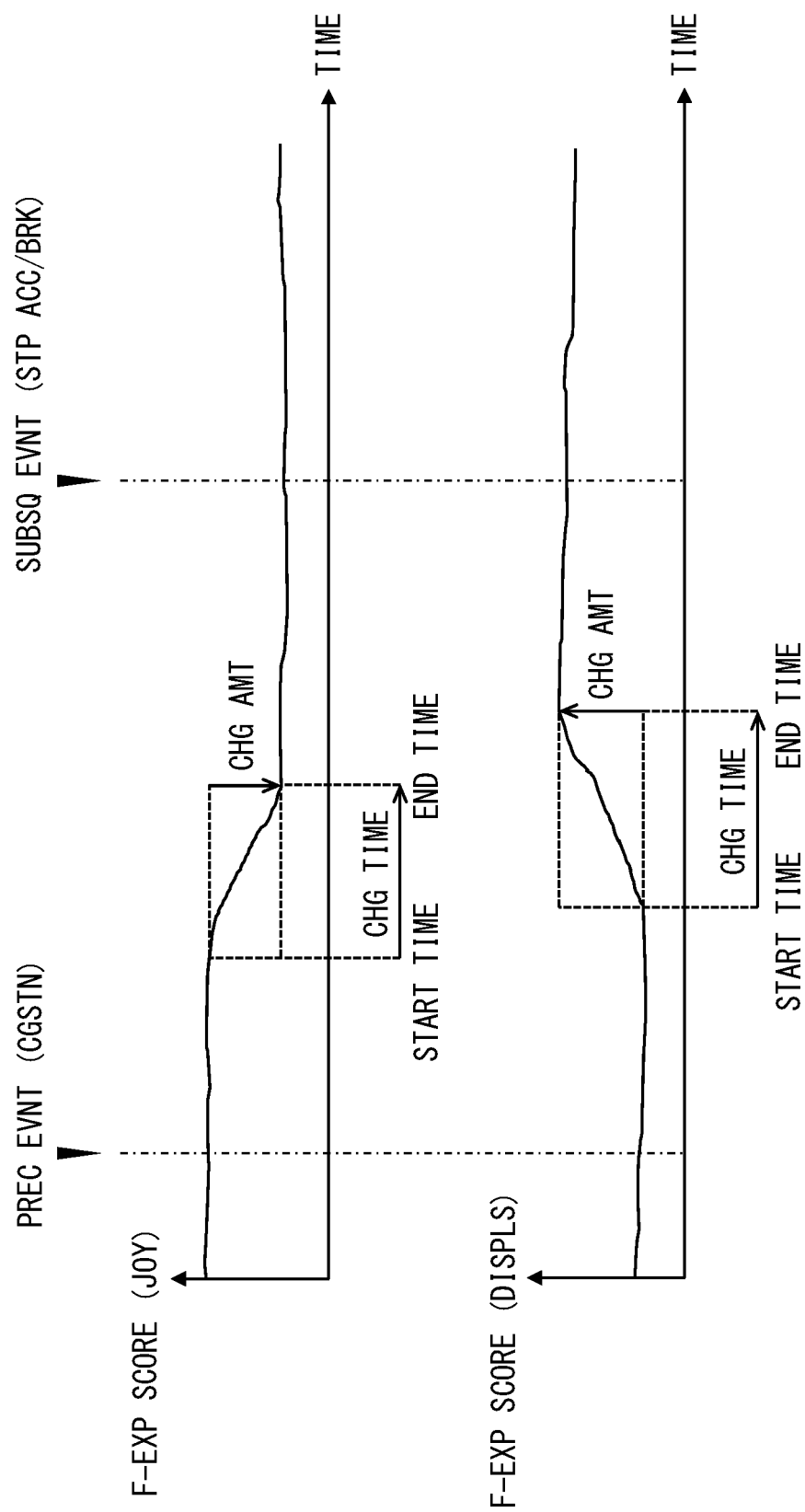
FIG. 3 is a diagram of an example of changes in facial expression scores.

FIG. 3 shows a change in the facial expression score of the user between (i) a preceding event, which is an event indicating traffic congestion and (ii) an event immediately after that, which is an event indicating steep acceleration or steep braking. In this example, the facial expression score indicating joy decreases after an event indicating traffic congestion, and then the facial expression score indicating displeasure increases.

The change time is a time between the start time and the end time of the change of the facial expression score. The start time and the end time of the change of the facial expression score can be the time when a differential value indicating the tendency of the change of the facial expression score becomes equal to or greater than a predetermined threshold value. The change amount of the facial expression score is a difference between the maximum value and the minimum value of the facial expression score at/during the change time.

The accumulated data table registration unit 106 is a functional unit that (i) associates the maximum value and the minimum value of the facial expression score of each of the facial expressions for each user and the change amount and the change time of the facial expression score of each of the facial expressions with the events related to these, and (ii) registers them to the accumulated data table 113 in the storage device 109. FIGS. 4 and 5 show an example of the accumulated data table 113. In the accumulated data table shown in FIGS. 4 and 5, the user's identification information, two consecutive events, and the maximum and minimum values of the facial expression score of each of the facial expressions acquired during a time between these two events, and the change amount and the change time based on the facial expression score are registered in association with each other. FIGS. 4 and 5, the accumulated data tables 113 are displayed in separate drawings, but these two accumulated data tables 113 separately shown in FIGS. 4 and 5 actually form one accumulated data table 113.

The emotion estimation table update unit 107 is a functional unit that updates an emotion estimation table 114 generated in the storage device 109 for each user. Here, the emotion estimation table is a table that expresses rules for converting facial expression scores into emotions. The emotion estimation table corresponds to an emotion estimation rule. FIGS. 6 and 7 show an example of the emotion estimation table 114 of a certain user. The emotion estimation table 114 shown in FIGS. 6 and 7 registers, in association with each other, (i) two consecutive events, (ii) the maximum and minimum facial expression scores of each of the facial expressions of the user between these two events, (iii) the maximum value and the minimum value of the change time (the start time and the end time during which the change occurs, see FIG. 3) based on the facial expression scores, and (iv) the emotion of the user having a correlation with these two events. Alternatively, the maximum value and minimum value may be defined at the start time and at the end time of a transition (as shown in FIG. 3). Note that, In FIGS. 6 and 7, the emotion estimation table 114 is displayed in separate drawings, but these two emotion estimation tables 114 separately shown in FIGS. 6 and 7 actually form one emotion estimation table 114. In other words, a portion of data for user B begins on the bottom of FIG. 6 (steep braking), and continues onto FIG. 7 (boarding, etc.).

Each event registered in the emotion estimation table 114 is: (i) a normal event, that is, an event caused by the user or (ii) an environmental event related to the surrounding environment of the user. For example, when the preceding event is an event indicating traffic congestion (an environmental event) and the subsequent event is an event indicating (a) steep acceleration, or (b) steep braking of the vehicle, or (c) an increase of the heart rate of the user, or an increase of the LF integrated value of the heart rate (normal events), the emotion of the user can be registered as "Irritation" in association with these events. When the preceding event is an event indicating a steep braking and the subsequent event is an event indicating (a) a decrease of the heart rate or (b) an increase of the HF integrated value, "comfort" is registered in association with these events as the emotion of the user. As described above, the emotions of the user registered in the emotion estimation table 114 are not limited to the emotions represented by the seven types of facial expressions, and various emotions that can be generated by the two consecutive events adoptable. FIG. 3 shows an example where the preceding event is environmental, and the subsequent event is normal.

The emotion estimation unit 108 is a functional unit that estimates the emotion of the user by using an index value that is at least one of (i) the facial expression score of each facial expression (such as a joy score and a displeasure score) of the user and (ii) the feature amount of such facial expression score. More specifically, the emotion estimation unit 108 can acquire a plurality of facial expression scores (for each of multiple emotions) of the user in a predetermined period from the facial expression score database 111 and can calculate an average value of these facial expression scores. It may be preferable that the predetermined period is equal to or longer than a length of time which typically allows the facial expression score to change in accordance with the change in the emotion of the user.

Next, the feature amount calculation unit 105 calculates the feature amount of the facial expression score for each facial expression. Then, the emotion estimation unit 108 identifies a record of the emotion estimation table 114 to which at least one of (i) an average value of the facial expression scores of each of the facial expressions and (ii) the feature amount of the facial expression score corresponds, and the emotion associated with the record is identified can then be estimated as the emotion of the user.

Note that when a plurality of records are identified, the emotion estimation unit 108 can estimate the emotion of the user as a mixture of individual/respective emotions associated with each of the identified records. In addition or alternatively, the emotion estimation unit 108 can estimate the individual emotion associated with each of the records respectively as the emotion of the user. In such case, the emotion estimation unit 108 can present a weight of each of those emotions.

Further, when the emotion estimation unit 108 estimates the emotion of the user using the facial expression score (without using the feature amount of the facial expression score of each facial expression), the emotion estimation unit 108 may alternatively estimate the emotion of the user by acquiring only one facial expression score from the facial expression score database 111, instead of acquiring a plurality of facial expression scores in a predetermined period.

Figure 8:
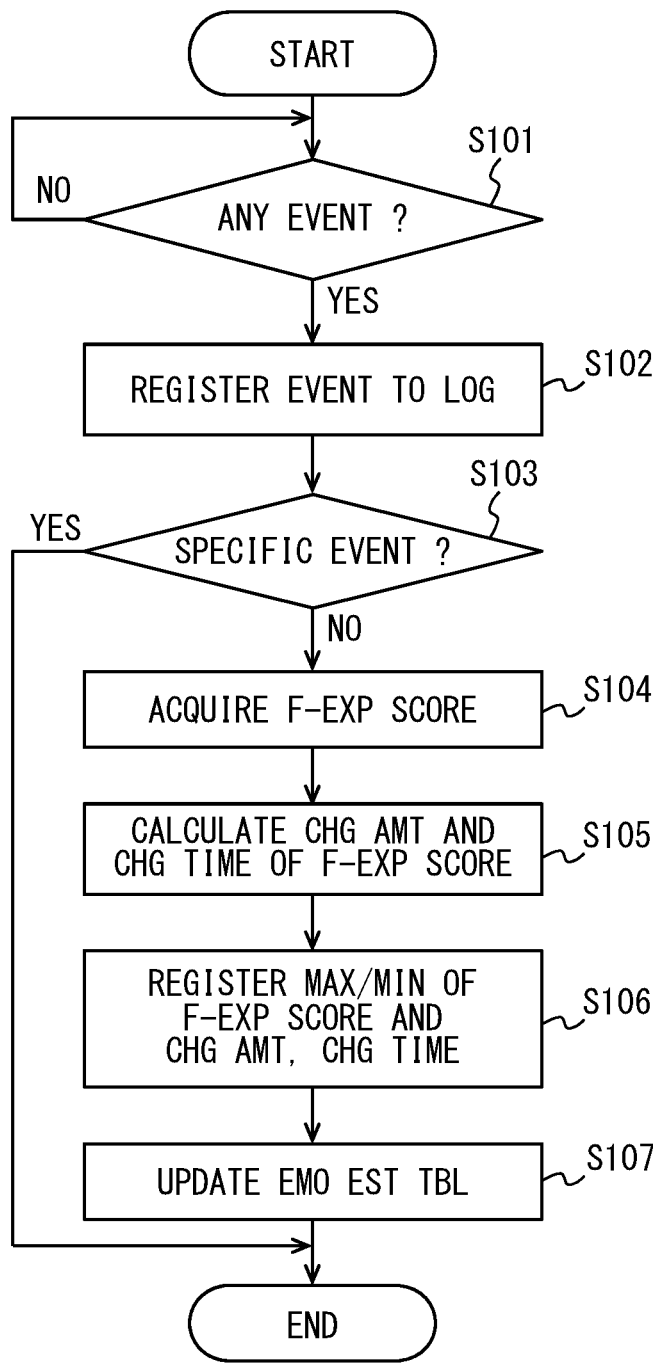
FIG. 8 is a flowchart of an example of processing performed by the emotion estimation device according to the first embodiment.

Next, with reference to FIG. 8, an example of processing performed by the emotion estimation device 10 according to the first embodiment is described. In step S101, the event detection unit 102 of the emotion estimation device 10 determines whether an event has occurred. If no event has occurred (NO), the process of step S101 is performed again. On the other hand, if an event has occurred (YES), the process branches to step S102.

In step S102, the event registration unit 103 registers the event detected in step S101 in the event log 112. In step S103, the event determination unit 104 refers to the event log 112, and determines whether at least one of (i) the event detected in step S101 and (ii) the event immediately before that (i.e., preceding the S101 event) is a specific event (such as drowsiness or conversation) that may possibly reduce the emotion estimation accuracy. If at least one of these events is a specific event (YES), the process of FIG. 8 ends. On the other hand, if both of these events are not specific events (NO), the process branches to step S104.

In step S104, the feature amount calculation unit 105 acquires the facial expression score of each of the facial expressions of the user between the event detected in step S101 and the event immediately before that from the facial expression score database 111. In step S105, the feature amount calculation unit 105 calculates the change amount and the change time of the facial expression score using the acquired facial expression scores.

In step S106, the accumulated data table registration unit 106 registers (i) the facial expression score of each facial expression of the user between the event detected in step S101 (subsequent event) and the event immediately before the event (preceding event), and (ii) the change amount and the change time of the facial expression score calculated in step S105 in the accumulated data table 113.

More specifically, the accumulated data table registration unit 106 acquires the facial expression score of each facial expression of the user between these events from the facial expression score database 111, and also acquires the user identification information 110 from the storage device 109. Then, the accumulated data table registration unit 106 registers the identification information of the user, the maximum value and the minimum value of the facial expression score, the change amount and the change time of the facial expression score in the accumulated data table 113 in association with each other. In step S107, the emotion estimation table update unit 107 updates the emotion estimation table 114, and the process of FIG. 8 ends.

More specifically, the emotion estimation table update unit 107 refers to the user emotion estimation table 114 identified by the user identification information that is stored in the storage device 109, and identifies records related to the event detected in step S101 and the event immediately before that. Next, the emotion estimation table update unit 107 compares (A) the maximum and minimum values of (a) the facial expression score of each facial expression, (b) the maximum and minimum values of the change amount of the facial expression score, and (c) the maximum and minimum values of the change time of the facial expression score respectively registered in the identified record with (B) the maximum and minimum values of the facial expression score and the change amount and the change time of the facial expression score registered in the accumulated data table 113 in step S106.

When at least one of the items (B) is out of the range of the items (A), that is, when the maximum and minimum values of the facial expression score and the change amount and the change time of the facial expression score registered in the accumulated data table 113 in step S106 are out of the range of the facial expression score and/or the change amount and the change time thereof registered in the identified record, the emotion estimation table update unit 107 uses out-of-range value(s) of any of the maximum value and the minimum value of the facial expression score, the change amount and the change time, to update the maximum and minimum values of the facial expression score, the change amount and/or the change time of the emotion estimation table 114.

Figure 9:
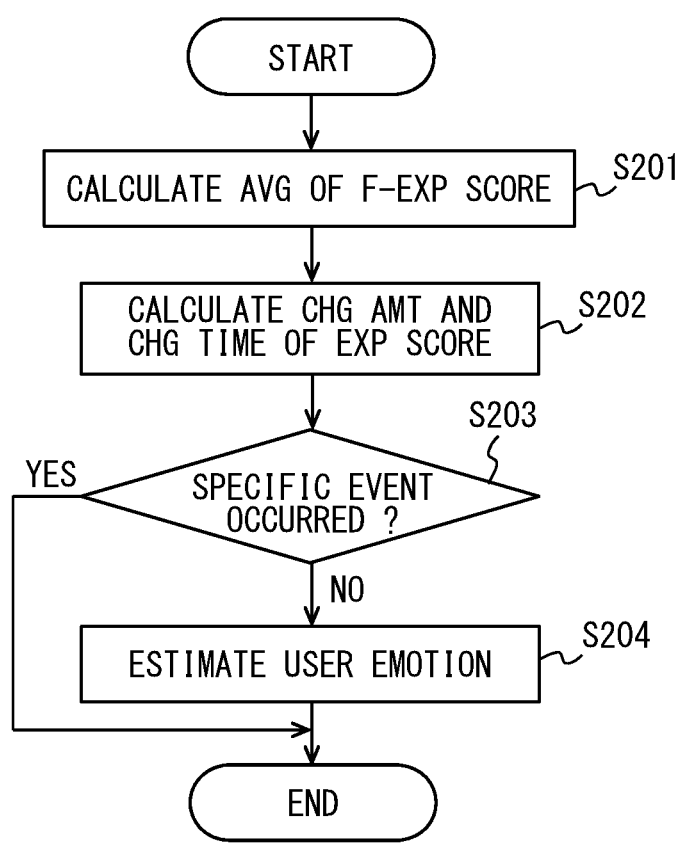
FIG. 9 is a flowchart of another example of processing performed by the emotion estimation device according to the first embodiment.

Next, with reference to FIG. 9, an other process performed by the emotion estimation device 10 according to the first embodiment is described. In step S201, the emotion estimation unit 108 acquires the facial expression score of each facial expression of the user in the predetermined period from the facial expression score database 111, and calculates the average value of the facial expression scores of each facial expression. In step S202, the feature amount calculation unit 105 acquires the facial expression score from the facial expression score database 111 and calculates the change amount and the change time of the facial expression score.

In step S203, the event determination unit 104 refers to the event log 112, and determines whether or not a specific event that may reduce the emotion estimation accuracy has occurred during the above-described predetermined period. If a specific event has occurred (YES), the process of FIG. 9 ends. On the other hand, if the specific event has not occurred (NO), the process branches to step S204.

In step S204, the emotion estimation unit 108 refers to the user emotion estimation table 114 identified by the user identification information stored in the storage device 109, and estimates the emotion of the user using at least one of (i) an average of the facial expression scores of the facial expressions calculated in step S201 and (ii) the change amount and the change time of the facial expression score of each facial expression calculated in step S202.

Effects of the First Embodiment

In the present embodiment, two consecutive events, index values of each facial expression of the user between the two events, and the emotions correlated with those events are registered in the emotion estimation table 114 in association with each other. The emotion estimation unit 108 refers to the emotion estimation table 114, and identifies the registered index values of each of the facial expressions of the user, which corresponds to one of (i) the facial expression score (i.e., an index of the expression of the user) acquired from the facial expression score database 111, and (ii) the feature amount of such facial expression score. Then, the emotion estimation unit 108 estimates the emotion associated with the identified index value as the user's emotion. That is, the emotion estimation unit 108 does not estimate the user's emotion based only on the correlation between the facial expression score and the user's emotion, but estimates the user's emotion at least partly based on the correspondence between (i) the index value of each of the facial expressions of the user between two consecutive events and (ii) the emotion(s) correlated with the two consecutive events.

Thereby, even when the correlation between the facial expression score and the emotion of the user is low/weak, the emotion of the user can be estimated with high accuracy.

Further, the emotion estimation device 10 also estimates the emotion of the user by using the emotions that are correlated with two consecutive events. Here, the emotion of the user caused by one event may not be uniquely determined. For example, when an event indicating a steep braking occurs, some users feel angry and others feel comfort. Therefore, when the emotion of the user is estimated by using the emotion correlated with one event, the estimation accuracy of such emotion may be low. On the other hand, the emotion estimation device 10 estimates the emotion of the user by using the emotions that are correlated with two consecutive events, rather than one event, thereby improving the estimation accuracy of the emotion.

Further, the two consecutive events may be a preceding environmental event related to the user's surrounding environment, and a subsequent normal event caused by the user. These events (in this order) are likely to affect the user's emotion and have a strong correlation with the user's emotion. In particular, when the subsequent event is an event caused by the user, the correlation between the event and the user's emotion becomes strong. Since the emotion estimation device 10 estimates the emotion of the user by using the emotion having a strong correlation with such event, the estimation accuracy of the emotion the emotion estimation device 10 can be improved. These consecutive events may be describes as: a preceding environmental event and a subsequent normal event.

Further, the emotion estimation table 114 registers (i) two consecutive normal events, and (ii) index values of each of the facial expressions of the user when a specific event has not occurred between the two consecutive normal events, and (iii) the emotions correlated with the two consecutive normal events in association with each other. In the emotion estimation table 114, the index value of each facial expression of the user when a specific event has occurred is not registered. When any specific event has not occurred, the emotion estimation unit 108 refers to the emotion estimation table 114, and identifies the registered index value of each of the facial expressions of the user when the specific event acquired from the facial expression score database 111 has not occurred. Then, the emotion estimation unit 108 estimates the emotion associated with the identified index value as the user's emotion.

In such manner, when an event that may reduce the estimation accuracy of the emotion of the user (a specific event) has not occurred, the emotion estimation table 114 in which the index value of each of the facial expressions of the user related to such event is not registered is usable to estimate the user's emotion. Therefore, the estimation accuracy of the emotion of the user can be improved.

Further, the emotion estimation device 10 includes the emotion estimation table 114 for each user, and estimates the emotion for each user using the emotion estimation table 114 for each user. In such manner, since the emotion can be estimated for each user by using the index value for each user, the estimation accuracy of the emotion of the user can be improved.

Furthermore, the emotion estimation device 10 estimates the emotion of the user by using the emotion(s) that is/are correlated with two consecutive events. As a result, the emotion of the user estimated by the emotion estimation device 10 is not limited to an emotion indicated by the facial expression score, and may be/may include various emotions of the user correlated with those, e.g., with two, events.

Second Embodiment

The second embodiment of the present disclosure is described with a focus on the differences from the first embodiment. In the second embodiment, the emotion estimation device 10 estimates the emotion of the user even when a specific event such as a drowsiness event or a conversation event that may reduce the emotion estimation accuracy has occurred.

In the second embodiment, the emotion estimation device 10 includes, in addition to the accumulated data table and emotion estimation table for a normal event as shown in FIGS. 4 to 7, the accumulated data table and the emotion estimation table for a specific event. The configurations of the accumulated data table and the emotion estimation table for a specific event are the same as the configurations of the accumulated data table and the emotion estimation table for a normal event.

Figure 10:
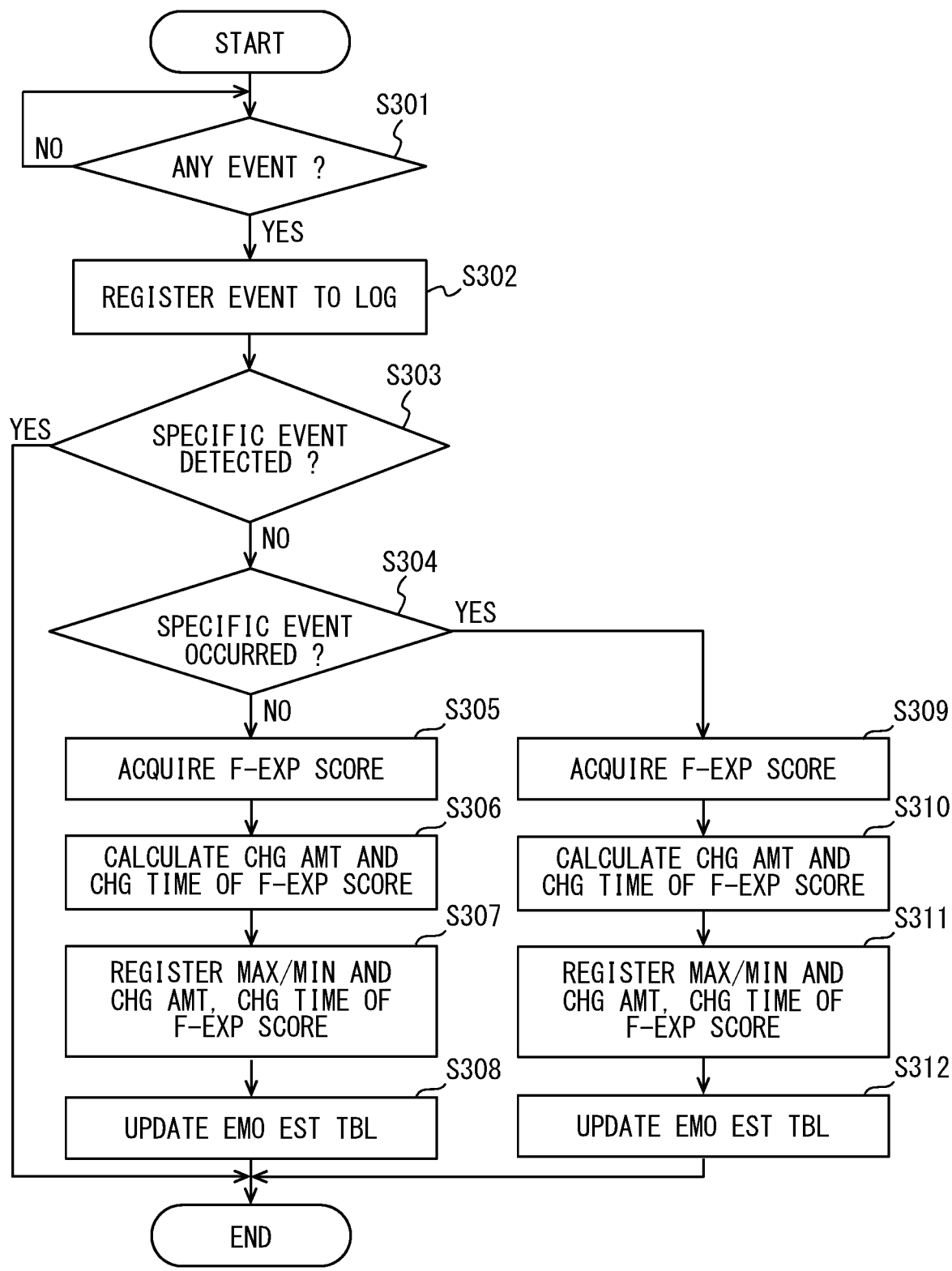
FIG. 10 is a flowchart of an example of processing performed by the emotion estimation device according to a second embodiment.

Now, with reference to FIG. 10, an example of processing performed by the emotion estimation device 10 according to the second embodiment is described. In step S301, the event detection unit 102 of the emotion estimation device 10 determines whether an event has occurred. If no event has occurred (NO), the process of step S301 is performed again. On the other hand, if an event has occurred (YES), the process branches to step S302.

In step S302, the event registration unit 103 registers the event detected in step S301 in the event log 112. In step S303, the event determination unit 104 refers to the event log 112, and determines whether the event detected in step S301 is a specific event. When the detected event is a specific event (YES), the process of FIG. 10 ends. On the other hand, if the detected event is not a specific event (NO), the process branches to step S304.

In step S304, the event determination unit 104 refers to the event log 112, and determines whether or not a specific event has occurred between the normal event detected in step S301 and the normal event immediately before that event (i.e., the one detected in S301). If a specific event has not occurred between these two normal events (NO), the process branches to step S305.

In step S305, the feature amount calculation unit 105 acquires the facial expression score of each facial expression of the user between the normal event detected in step S301 and the immediately preceding normal event from the facial expression score database 111. In step S306, the feature amount calculation unit 105 uses the acquired facial expression score to calculate the change amount and the change time of the facial expression score.

In step S307, the accumulated data table registration unit 106 registers (i) the facial expression score of each of the facial expressions of the user between the normal event detected in step S301 and the normal event immediately before the normal event, and (ii) the change amount and the change time of the facial expression calculated in step S306 in the accumulated data table 113 for a normal event. In step S308, the emotion estimation table update unit 107 updates the emotion estimation table 114 for a normal event, and the process of FIG. 10 ends.

On the other hand, if it is determined in step S304 that a specific event has occurred between the normal event detected in step S301 and the normal event immediately before that (YES), the process branches to step S309.

In step S309, the feature amount calculation unit 105 acquires the facial expression score of each of the facial expressions of the user between the normal event detected in step S301 and the normal event immediately before that from the facial expression score database 111. In step S310, the feature amount calculation unit 105 calculates the change amount and the change time of the facial expression score using the acquired facial expression score.

In step S311, the accumulated data table registration unit 106 registers (i) the facial expression score of each of the facial expressions of the user between the normal event detected in step S301 and the immediately preceding normal event, and (ii) the change amount and the change time of the facial expression score calculated in step S310 in the accumulated data table 113 for a specific event. In step S312, the emotion estimation table update unit 107 updates the emotion estimation table 114 for a specific event, and the process of FIG. 10 ends.

Figure 11:
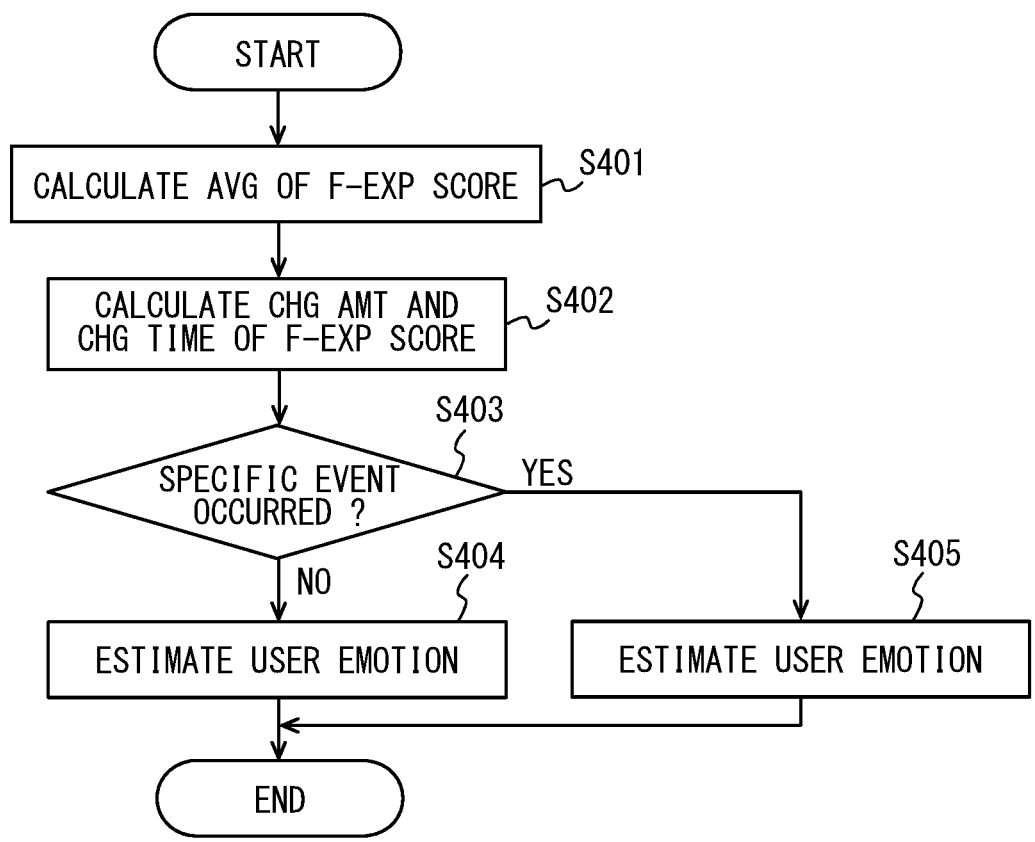
FIG. 11 is a flowchart of another example of processing performed by the emotion estimation device according to the second embodiment.

Next, with reference to FIG. 11, an other process performed by the emotion estimation device 10 according to the second embodiment is described. In step S401, the emotion estimation unit 108 acquires the facial expression score of each of the facial expressions of the user in the predetermined period from the facial expression score database 111, and calculates the average value of the facial expression scores of each of the facial expressions. In step S402, the feature amount calculation unit 105 acquires the facial expression score from the facial expression score database 111, and calculates the change amount and the change time of the facial expression score.

In step S403, the event determination unit 104 refers to the event log 112, and determines whether or not a specific event has occurred in the predetermined period. If the specific event has not occurred (NO), the process branches to step S404. In step S404, the emotion estimation unit 108 refers to the emotion estimation table 114 for a normal event, and estimates the emotion of the user, by using at least one of (i) the average value of the facial expression score of each of the facial expressions calculated in step S401 and (ii) the change amount and the change time of the facial expression score of each of the facial expressions calculated in step S402.

On the other hand, if it is determined in step S403 that a specific event has occurred in the predetermined period (YES), the process branches to step S405. In step S405, the emotion estimation unit 108 refers to the emotion estimation table 114 for a specific event, and estimates the emotion of the user, by using at least one of (i) the average value of the facial expression score of each of the facial expressions calculated in step S401 and (ii) the change amount and the change time of the facial expression score of each of the facial expressions calculated in step S402.

Effects of the Second Embodiment

In the second embodiment, the emotion estimation device 10 has the emotion estimation table 114 for a normal event and the emotion estimation table 114 for a specific event that may reduce the estimation accuracy of the emotion of the user.

When a specific event has occurred, the emotion estimation unit 108 refers to the emotion estimation table 114 for a specific event, and identifies the registered index value of each of the facial expressions of the user upon a determination that the specific event acquired from the facial expression score database 111 has occurred. Then, the emotion estimation unit 108 estimates the emotion associated with the index value as the emotion of the user. That is, when a specific event has occurred, the emotion estimation unit 108 does not estimate the emotion of the user by using the emotion estimation table 114 for a normal event.

Thereby, when an event that may reduce the estimation accuracy of the emotion of the user has occurred, the emotion can be estimated while improving the estimation accuracy of such emotion.

Third Embodiment

Next, the third embodiment of the present disclosure is described with a focus on the differences from the above-described embodiments. In the third embodiment, the emotion estimation unit 108 uses an emotion estimation model 115 to estimate the emotion of the user.

Figure 12:
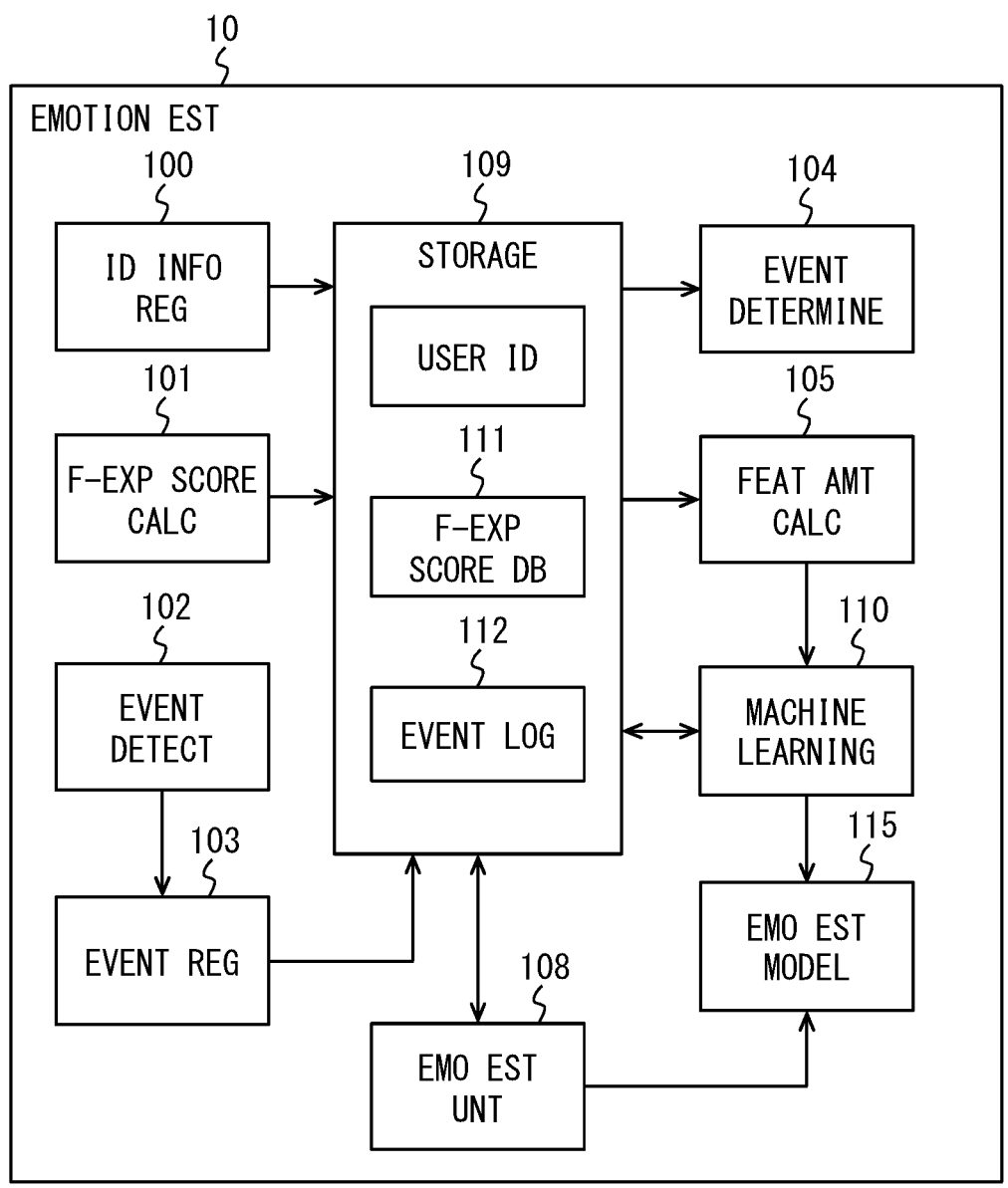
FIG. 12 is a diagram of a configuration of the emotion estimation device according to a third embodiment.

As shown in FIG. 12, emotion estimation device 10 includes the identification information registration unit 100, the facial expression score calculation unit 101, the event detection unit 102, the event registration unit 103, the event determination unit 104, the feature amount calculation unit 105, the emotion estimation unit 108, the storage device 109, a machine learning unit 110, and the emotion estimation model 115.

The machine learning unit 110 is a functional unit that learns the emotion estimation model 115 using various machine learning algorithms. The emotion estimation model 115 is a program for estimating the emotion of the user, which can learn (i.e., can be trained) by using various machine learning algorithms. The emotion estimation model 115 is prepared for each user.

More specifically, the machine learning unit 110 uses, as teacher data, (A) at least one of (i) the facial expression score of each facial expression of the user and (ii) the feature amount of the facial expression score between two consecutive events, and (B) a value indicating an emotion correlated with the two consecutive events to train the emotion estimation model 115.

The facial expression score of each facial expression of the user and the feature amount of such facial expression score, which are used as teacher data, and the value indicating the emotion correlated with two consecutive events have a correlation. For example, as shown in FIG. 13, when a preceding event is an event indicating boarding (i.e., getting into a vehicle) and a subsequent event is an event indicating engine start, the emotion of the user is likely to be "neutral." When the emotion of the user is "neutral," the facial expression score of each facial expression of the user and the feature amount of such facial expression score respectively have a value indicating "neutral."

If a preceding event is an event indicating traffic congestion and a subsequent event is an event indicating a steep acceleration, a steep braking, an increase of the heart rate, or an increase of the LF integrated value, the user's emotion is most likely be "irritation." When the user's emotion is "irritated," the facial expression score of each facial expression of the user and the feature amount of such facial expression score respectively have a value indicating "irritation."

Further, when a preceding event is an event indicating cut-in or a steep braking, and a subsequent event is an event indicating a steep acceleration, an increase of the heart rate, or an increase of the LF integrated value, the emotion of the user is likely to be "anger." If a preceding event is an event indicating an increase of the heart rate or an increase of the LF integrated value, and a subsequent event is an event indicating a steep acceleration or a decrease of the inter-vehicle distance, the emotion of the user is likely to be "anger." When the emotion of the user is "anger," the facial expression score of each facial expression of the user and the feature amount of such facial expression score respectively have a value indicating "anger."

Furthermore, when a preceding event is an event indicating a steep braking and a subsequent event is an event indicating a decrease of the heart rate or an increase of the HF integrated value, the emotion of the user is likely to be "comfort/relief of mind." When the user's emotion is "comfort," the facial expression score of each facial expression of the user and the feature amount of such facial expression score respectively have a value indicating "comfort." It should be noted that the two consecutive events and the emotion(s) correlated with these events are not limited to those shown in FIG. 13, and various other events and emotions correlated with the events are adoptable. The emotions correlated with the events are not limited to the emotions represented by the above-described seven types of facial expressions, and various, other emotions generatable by two consecutive events adoptable.

The emotion estimation model 115 learned/trained by using both of (A) the facial expression score of each facial expression of the user and the feature amount of such facial expression score and (B) the value indicating the emotion is used (i) for an input of both of the facial expression score of each facial expression of the user and the feature amount of such facial expression score and (ii) for an output of a value indicating an emotion corresponding thereto. The emotion estimation unit 108 estimates an emotion of the user based on a value indicating an emotion, which is an output of the emotion estimation model 115 after inputting the acquired facial expression score of each facial expression of the user and the feature amount of such facial expression score to the learned emotion estimation model 115. Note that the value indicating the emotion output from the emotion estimation model 115 and the emotion of the user are associated with each other on a one-to-one basis.

Further, when the facial expression score of each facial expression of the user is input, the emotion estimation model 115 learned/trained by using the facial expression score of each facial expression of the user and the value indicating the emotion outputs, upon having an input of the facial expression score of each facial expression of the user, a value indicating an emotion that corresponds to such (i.e., inputted) facial expression score. The emotion estimation unit 108 estimates an emotion of the user, based on a value indicating an emotion that is output from the learned emotion estimation model 115, after inputting the acquired facial expression score of each facial expression of the user thereto, i.e., to the emotion estimation model 115.

Further, the emotion estimation model 115 learned/trained by using (i) the feature amount of the facial expression score of each facial expression of the user and (ii) the value indicating the emotion outputs, upon having an input of the feature amount of the facial expression score of each facial expression of the user, a value indicating an emotion that corresponds to the feature amount of the facial expression score. The emotion estimation unit 108 estimates an emotion of the user based on a value indicating an emotion, which is an output of the emotion estimation model after having the acquired feature amount of the facial expression score of each facial expression of the user inputted to the learned emotion estimation model 115.

Figure 14:
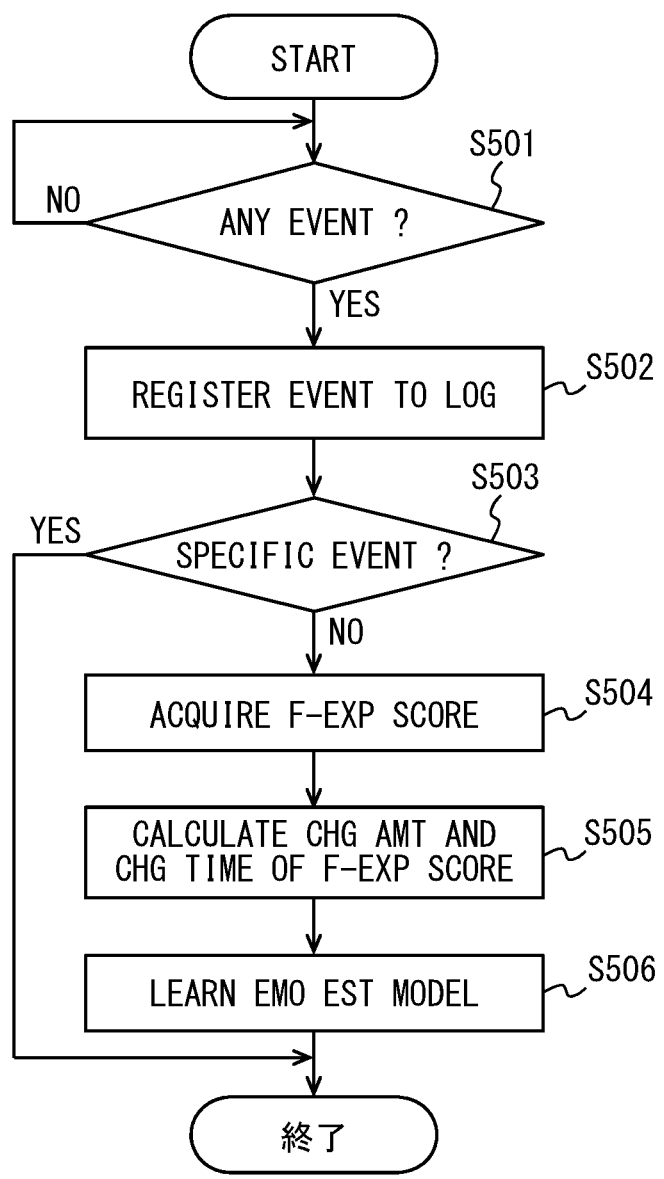
FIG. 14 is a flowchart of an example of processing performed by the emotion estimation device according to the third embodiment.

Now, with reference to FIG. 14, an example of processing performed by the emotion estimation device 10 according to the third embodiment is described. In the process shown in FIG. 14, the emotion estimation model 115 is learned/trained using (A) both the facial expression score of each facial expression of the user and the feature amount of such facial expression score, and (B) the value indicating the emotion.

In step S501, the event detection unit 102 of the emotion estimation device 10 determines whether an event has occurred. If no event has occurred (NO), the process of step S501 is performed again. On the other hand, if an event has occurred (YES), the process branches to step S502.

In step S502, the event registration unit 103 registers the event detected in step S501 in the event log 112. In step S503, the event determination unit 104 refers to the event log 112, and determines whether at least one of (i) the event detected in step S501 and (ii) the event immediately before that (i.e., preceding the S501 event) is a specific event that may possibly reduce the emotion estimation accuracy. If at least one of these events is a specific event (YES), the process of FIG. 14 ends. On the other hand, if both of these events are not specific events (NO), the process branches to step S504.

In step S504, the feature amount calculation unit 105 acquires the facial expression score of each facial expression of the user between the event detected in step S501 and the event immediately before that from the facial expression score database 111. In step S505, the feature amount calculation unit 105 calculates the change amount and the change time of the facial expression score using the acquired facial expression score. In step S506, the machine learning unit 110 learns/trains the emotion estimation model 115, and the process in FIG. 14 ends.

More specifically, the machine learning unit 110 identifies the emotion estimation model 115 of the user using the identification information of the user registered in the storage device 109. Next, the machine learning unit 110 acquires the facial expression score of each facial expression of the user between the event detected in step S501 and the event immediately before that from the facial expression score database 111. Then, the machine learning unit 110 learns/trains the emotion estimation model 115 by using the following as the teacher data, i.e., by using (i) the facial expression score, (ii) the feature amount of such facial expression score calculated in step S505, and a value indicating an emotion or emotions corresponding respectively to these two consecutive events.

Figure 15:
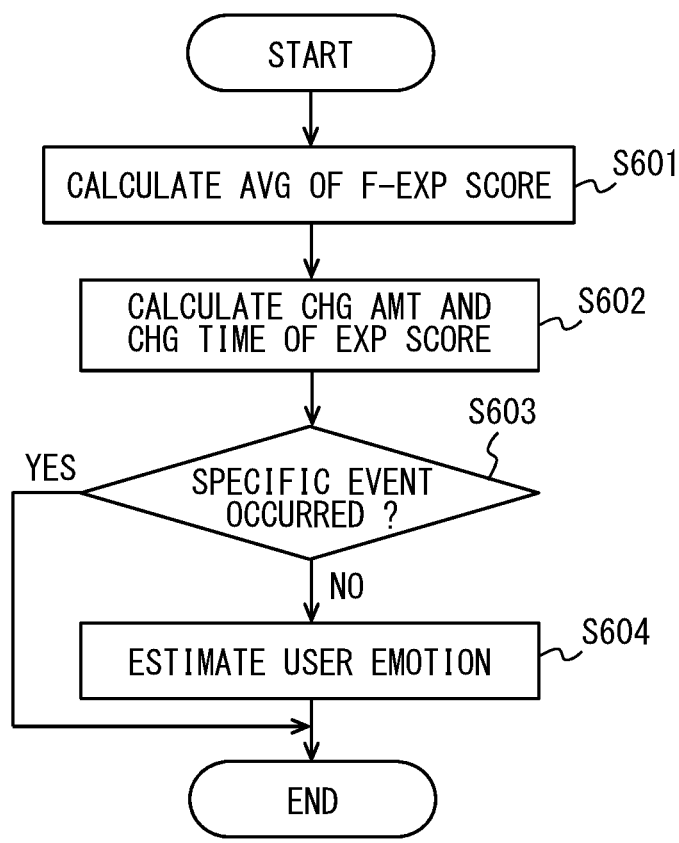
FIG. 15 is a flowchart of another example of processing performed by the emotion estimation device according to the third embodiment.

Now, with reference to FIG. 15, an other process performed by the emotion estimation device 10 according to the third embodiment is described. In the process shown in FIG. 15, the emotion of the user is estimated using both of the facial expression score of each facial expression of the user and the feature amount of such facial expression score.

In step S601, the emotion estimation unit 108 acquires the facial expression score of each facial expression of the user in the predetermined period from the facial expression score database 111, and calculates the average value of the facial expression scores of each facial expression. In step S602, the feature amount calculation unit 105 acquires the facial expression score from the facial expression score database 111, and calculates the change amount and the change time of the facial expression score.

In step S603, the event determination unit 104 refers to the event log 112, and determines whether or not a specific event that may reduce the emotion estimation accuracy has occurred during the above-described predetermined period. If a specific event has occurred (YES), the process of FIG. 15 ends. On the other hand, if the specific event has not occurred (NO), the process branches to step S604. In step S604, the emotion estimation unit 108 estimates the emotion of the user by using (i) the average value of the facial expression scores of the facial expressions calculated in step S601 and (ii) the change amount and the change time of the facial expression score of each of the facial expressions calculated in step S602, and the process of FIG. 15 ends.

More specifically, the emotion estimation unit 108 inputs, to the emotion estimation model 115 of a user who is identified by the user identification information stored in the storage device 109, (a) the average value of the facial expression scores of the facial expressions calculated in step S601 and (b) the change amount and the change time of the facial expression score of each facial expression calculated in step S602. Then, the emotion estimation unit 108 estimates an emotion of the user based on the value indicating the emotion, which is output by the emotion estimation model 115. That is, the emotion estimation unit 108 does not estimate the user's emotion based only on the correlation between the facial expression score and the user's emotion, but estimates the user's emotion based on the correspondence between (i) the index value of each of the facial expressions of the user between two consecutive events and (ii) the emotion(s) correlated with the two consecutive events.

Fourth Embodiment

Next, the fourth embodiment of the present disclosure is described with a focus on the differences from the third embodiment. In the fourth embodiment, the emotion estimation device 10 estimates the emotion of the user even when a specific event that may possibly reduce the emotion estimation accuracy has occurred. The emotion estimation device 10 includes a normal event emotion estimation model 115 and a specific event emotion estimation model 115.

The normal event emotion estimation model 115 is an emotion estimation model used for estimating a user's emotion when a specific event has not occurred between two consecutive normal events. The machine learning unit 110 uses (A) a facial expression score, which is an index value of each facial expression of the user between two consecutive normal events, and a feature amount of such facial expression score, as well as (B) a value indicating an emotion that is correlated with these events, to train the normal event emotion estimation model 115. In such case, facial expression scores such as a facial expression score when the user feels drowsy, a facial expression score when the user is having conversation and the like, which may reduce the emotion estimation accuracy, are not used for learning/training the estimation model 115.

The specific event emotion estimation model 115 is an emotion estimation model used for estimating a user's emotion when a specific event has occurred between two consecutive normal events. The machine learning unit 110 uses (A) a facial expression score, which is an index value of each facial expression of the user between two consecutive normal events, and a feature amount of such facial expression score, as well as (B) a value indicating an emotion that is correlated with these events, to train the specific event emotion estimation model 115. In such case, facial expression scores such as a facial expression score when the user feels drowsy, a facial expression score when the user is having conversation and the like, which may reduce the emotion estimation accuracy, are used for learning/training the estimation model 115.

Figure 16:
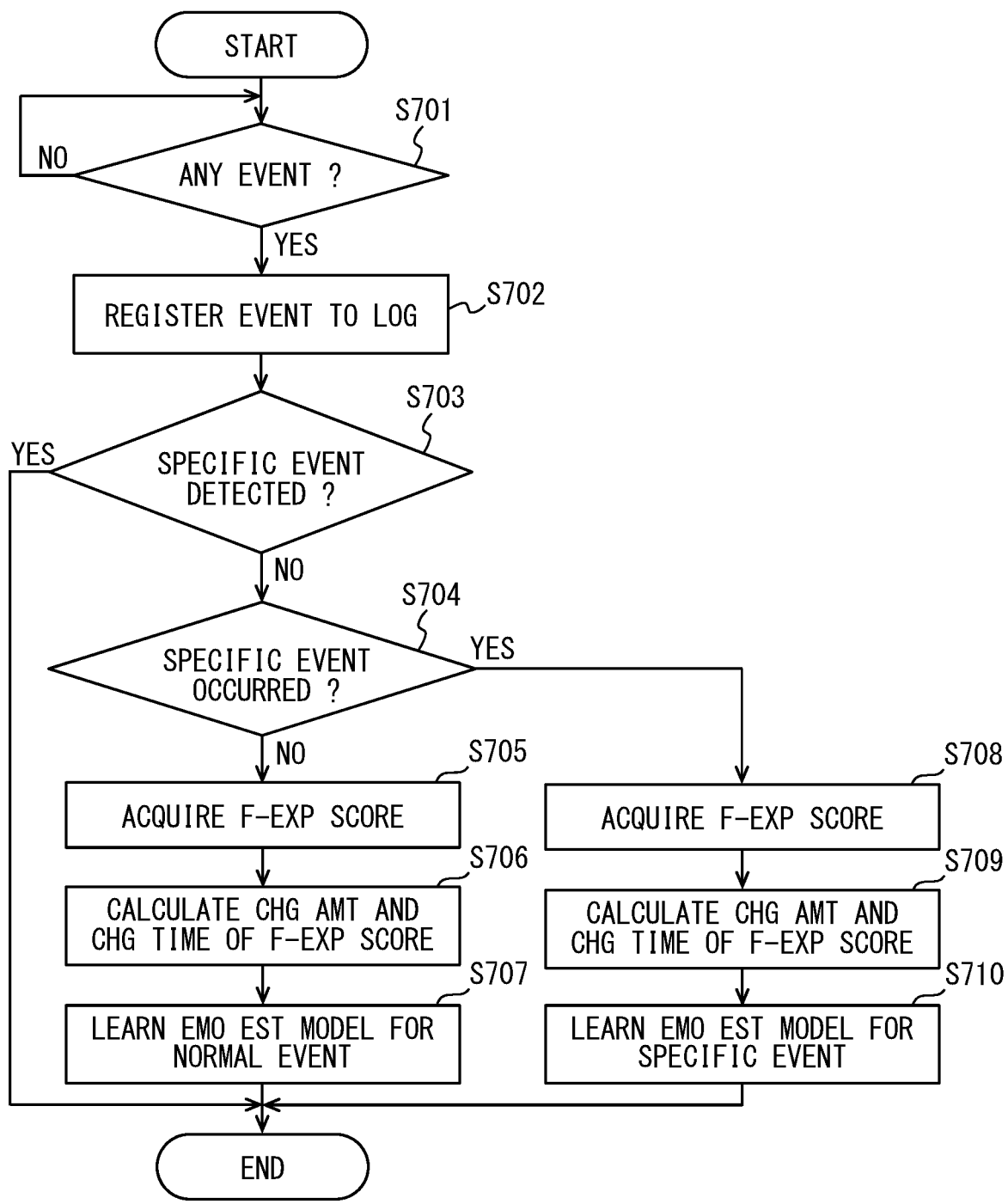
FIG. 16 is a flowchart of an example of processing performed by the emotion estimation device according to a fourth embodiment.

Next, with reference to FIG. 16, an example of processing performed by the emotion estimation device 10 according to the fourth embodiment is described. In step S701, the event detection unit 102 of the emotion estimation device 10 determines whether an event has occurred. If no event has occurred (NO), the process of step S701 is performed again. On the other hand, if an event has occurred (YES), the process branches to step S702.

In step S702, the event registration unit 103 registers the event detected in step S701 in the event log 112. In step S703, the event determination unit 104 refers to the event log 112, and determines whether the event detected in step S701 is a specific event. When the detected event is a specific event (YES), the process of FIG. 16 ends. On the other hand, if the detected event is not a specific event (NO), the process branches to step S704.

In step S704, the event determination unit 104 refers to the event log 112, and determines whether or not a specific event has occurred between the normal event detected in step S701 and the normal event immediately before that event (i.e., the one detected in S701). If a specific event has not occurred between these two normal events (NO), the process branches to step S705.

In step S705, the feature amount calculation unit 105 acquires the facial expression score of each facial expression of the user between the normal event detected in step S701 and the immediately preceding normal event from the facial expression score database 111. In step S706, the feature amount calculation unit 105 uses the acquired facial expression score to calculate the change amount and the change time of the facial expression score. In step S707, the machine learning unit 110 learns/trains the normal event emotion estimation model 115, and the process in FIG. 16 ends.

More specifically, the machine learning unit 110 uses the identification information of the user stored in the storage device 109 to identify the normal event emotion estimation model 115 of the relevant user. Next, the machine learning unit 110 acquires the facial expression score of each facial expression of the user between the normal event detected in step S701 and the normal event immediately before that from the facial expression score database 111. Then, the machine learning unit 110 uses (A) the facial expression score and the feature amount of such facial expression score calculated in step S706, and (B) the value indicating the emotion that corresponds to these two consecutive events as the teacher data, to train the normal event emotion estimation model 115.

On the other hand, if it is determined in step S704 that a specific event has occurred between the normal event detected in step S701 and the immediately preceding normal event (YES), the process branches to step S708.

In step S708, the feature amount calculation unit 105 acquires the facial expression score of each facial expression of the user between the normal event detected in step S701 and the immediately preceding normal event from the facial expression score database 111. In step S709, the feature amount calculation unit 105 calculates the change amount and the change time of the facial expression score using the acquired facial expression score. In step S710, the machine learning unit 110 learns/trains the specific event emotion estimation model 115, and the process of FIG. 16 ends.

More specifically, the machine learning unit 110 uses the identification information of the user stored in the storage device 109 to identify the specific event emotion estimation model 115 of the relevant user. Next, the machine learning unit 110 acquires the facial expression score of each facial expression of the user between the normal event detected in step S701 and the normal event immediately before that from the facial expression score database 111. Then, the machine learning unit 110 uses (A) the facial expression score and the feature amount of such facial expression score calculated in step S706, and (B) the value indicating the emotion that corresponds to these two consecutive events as the teacher data, to train the specific event emotion estimation model 115.

Figure 17:
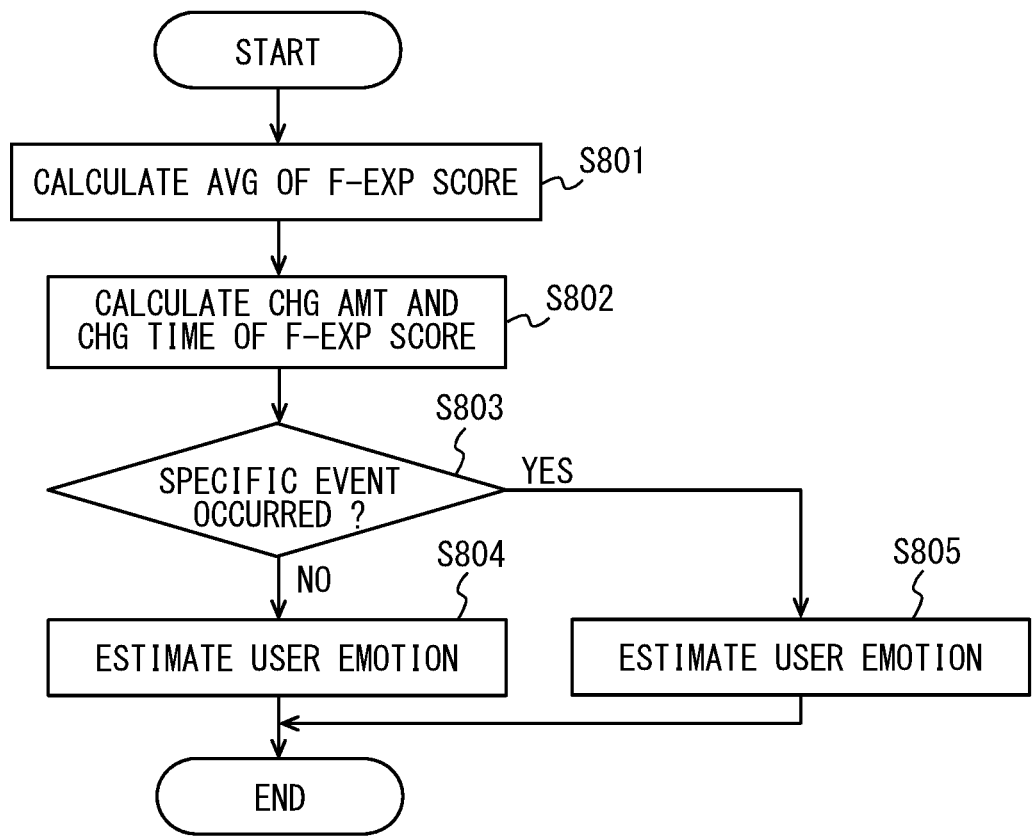
FIG. 17 is a flowchart of another example of processing performed by the emotion estimation device according to the fourth embodiment.

Next, with reference to FIG. 17, another process performed by the emotion estimation device 10 according to the fourth embodiment is described. In step S801, the emotion estimation unit 108 acquires the facial expression score of each of the facial expressions of the user in the predetermined period from the facial expression score database 111, and calculates the average value of the facial expression scores of each of the facial expressions. In step S802, the feature amount calculation unit 105 acquires the facial expression score from the facial expression score database 111, and calculates the change amount and the change time of the facial expression score.

In step S803, the event determination unit 104 refers to the event log 112, and determines whether or not a specific event has occurred in the predetermined period. If the specific event has not occurred (NO), the process branches to step S804. In step S804, the emotion estimation unit 108 uses (i) the average value of the facial expression score of each facial expression calculated in step S801 and (ii) the change amount and the change time of the facial expression score of each facial expression calculated in step S802 to estimate the emotion of the user, and the process of FIG. 17 ends.

More specifically, the emotion estimation unit 108 inputs, to the relevant user's normal event emotion estimation model 115 identified by the user identification information stored in the storage device 109, (i) the average value of the facial expression score of each facial expression calculated in step S801 and (ii) the change amount and the change time of the facial expression score of each facial expression calculated in step S802. Then, the emotion estimation unit 108 estimates the emotion of the user based on the value indicating the emotion output by the emotion estimation model 115.

On the other hand, if it is determined in step S803 that a specific event has occurred in the predetermined period (YES), the process branches to step S805. In step S805, the emotion estimation unit 108 estimates the emotion of the user, by using (i) the average value of the facial expression score of each facial expression calculated in step S801 and (ii) the change amount and the change time of the facial expression score of each facial expression calculated in step S802, and the process of FIG. 17 ends.

More specifically, the emotion estimation unit 108 inputs, to the relevant user's specific event emotion estimation model 115 identified by the user identification information stored in the storage device 109, (i) the average value of the facial expression score of each facial expression calculated in step S801 and (ii) the change amount and the change time of the facial expression score of each facial expression calculated in step S802. Then, the emotion estimation unit 108 estimates the emotion of the user based on the value indicating the emotion output by the emotion estimation model 115.

OTHER EMBODIMENTS

The present disclosure is not limited to the above-described embodiments, but can be implemented with various modifications. For example, in other embodiments, the facial expression score of each facial expression of the user and the feature amount of such facial expression score may be registered in the accumulated data table 113 and the emotion estimation table 114 in association with three or more consecutive events. In such case, emotion(s) associated with three or more consecutive events is/are registered in the emotion estimation table 114.

Further, in yet other embodiments, (A) at least one of (i) the facial expression score of each facial expression and (ii) the feature amount of such facial expression score in a period of three or more consecutive events, and (B) a value indicating an emotion correlated with the three or more consecutive events may be used as teacher data to train the emotion estimation model 115.

Further, in still yet other embodiments, the state monitoring device 70 may calculate the facial expression score from the user's face image, and may provide such facial expression score to the emotion estimation device 10.

Further, in still yet other embodiments, the biometric information acquisition device 80 may acquire an electrocardiographic signal indicating an active potential generated by cardiomyocytes of the user, in addition to the pulse wave signal or in place of the pulse wave signal. In such case, as a specific example of the biometric information acquisition device 80 that acquires an electrocardiographic signal, for example, an electrode installed on a steering wheel of a vehicle, a wearable device that can be worn by a user, or the like can be given. The biometric information acquisition device 80 is capable of acquiring an electrocardiographic signal from the user while being in contact with the body surface of the user, and transmitting the electrocardiographic signal to the emotion estimation device 10.

The controls and methods described in the present disclosure may be implemented by a dedicated computer manufactured by configuring a processor programmed to perform one or more specific functions implemented in a computer program. Also, the devices and methods described in the present disclosure may be implemented by dedicated hardware logic circuits. Further, the devices and methods described in the present disclosure may also be implemented by a combination of one or more dedicated computers manufactured by configuring a processor that executes a computer program and one or more hardware logic circuits. The computer program can be stored in a computer-readable non-transitory, tangible storage medium as instructions performed by the computer.

What is claimed is:

1. An emotion estimation device for estimating an emotion of a user, the emotion estimation device comprising:
   at least one processor;
   at least one non-transitory memory storage device; and
   an emotion estimation unit estimating the emotion of the user as an emotion associated with an index value of each facial expression of the user during a period including consecutive events, wherein the estimation is based on a correspondence between:
   (A) the index value which is one of (i) a facial expression score of the facial expression of the user between the consecutive events, and (ii) a feature amount related to a change of such facial expression score, and
   (B) the emotion correlated with the consecutive events; and
   an emotion estimation model that is trained by using, as teacher data, (A) an index value of each facial expression of the user between the consecutive events, and (B) a value indicating an emotion that is correlated with the consecutive events, wherein the emotion estimation unit estimates the emotion of the user based on the value indicating the emotion which is output from the emotion estimation model, after inputting thereto the index value of each facial expression of the user, and wherein the emotion estimation model is trained, when a specific event which may reduce the emotion estimation accuracy has not occurred between the consecutive events, by using as teacher data, (A) the index value of each facial expression of the user between the plurality of consecutive events, and (B) the value indicating the emotion that is correlated with the plurality of consecutive events, and the emotion estimation unit estimates the emotion of the user, when the specific event has not occurred, based on the value indicating the emotion which is output from the emotion estimation model, by inputting thereto the index value of each facial expression of the user acquired when the specific event has not occurred.

2. The emotion estimation device according to claim 1, wherein the consecutive events are: a preceding event that is an environmental event, and a subsequent event that is a normal event, wherein an environmental event is an event regarding the environment around the user or around a user's vehicle, and wherein a normal event is an event that directly physically involves the user.

3. The emotion estimation device according to claim 1, wherein:

(A) an emotion estimation rule in the device associates:
  (i) the consecutive events,
  (ii) the index value of each facial expression of the user between the consecutive events, and
  (iii) the emotion correlated with the consecutive events, and (B) the emotion estimation unit estimates the emotion of the user as a one associated with the acquired index value of each facial expression of the user, based on the emotion estimation rule.

4. The emotion estimation device according to claim 3, wherein (I) the emotion estimation rule includes
  a first emotion estimation rule that associates with each other, upon determining that the specific event has not occurred between the consecutive events, (i) the consecutive events, (ii) the index value of each facial expression of the user between the consecutive events, and (iii) the emotion correlated with the consecutive events, and
  a second emotion estimation rule that associates with each other, upon determining that the specific event occurred between the consecutive events, (i) the consecutive events, (ii) the index value of each facial expression of the user between the consecutive events, and (iii) the emotion correlated with the consecutive events, and (II) the emotion estimation unit estimates the emotion of the user
  as an emotion associated with the index value of each facial expression of the user when the specific event has not occurred, based on the first emotion estimation rule, and
  as a one associated with the index value of each facial expression of the user when the specific event has occurred, based on the second emotion estimation rule.

5. The emotion estimation device according to claim 3, wherein the emotion estimation rule is prepared for each user, and
the emotion estimation unit estimates the emotion of the user as a one which is associated with the acquired index value of each facial expression of the user based on the emotion estimation rule of the user who is identified by user identification information.

6. The emotion estimation device according to claim 1, wherein (A) the emotion estimation rule associates with each other
  (i) the consecutive events,
  (ii) the index value of each facial expression of the user between the consecutive events, wherein when a specific event which may reduce the emotion estimation accuracy of an emotion of the user estimated by the emotion estimation unit has not occurred between the consecutive events, and
  (iii) the emotion correlated with the consecutive events, and (B) the emotion estimation units estimates, upon determining that the specific event has not occurred, the emotion of the user as the one associated with the acquired index value of each facial expression of the user based on the emotion estimation rule.

7. The emotion estimation device according to claim 6, wherein the specific event is an event indicating drowsiness of the user or an event indicating that the user is in a conversation.

8. The emotion estimation device according to claim 1, wherein (I) the emotion estimation model includes
  a first emotion estimation model trained by using, as teacher data, (A) the index value of each facial expression of the user between the consecutive events, and (B) the value indicating the emotion that is correlated with of consecutive events, when a specific event which may reduce the emotion estimation accuracy has not occurred between the consecutive events, and
  a second emotion estimation model trained by using, as teacher data, (A) the index value of each facial expression of the user between the consecutive events, and (B) the value indicating the emotion that is correlated with these events, when the specific event has occurred between the consecutive events, and (II) the emotion estimation unit estimates the emotion of the user
  as a one based on the value indicating the emotion which is output from the first emotion estimation model after inputting thereto the index value of each facial expression of the user acquired when the specific event has not occurred, and
  as the one based on the value indicating the emotion which is output from the second emotion estimation model by inputting thereto the index value of each facial expression of the user acquired when the specific event has occurred.

9. The emotion estimation device according to claim 1, wherein
the emotion estimation model is prepared for each user, and
the emotion estimation unit estimates the emotion of the user based on a value indicating an emotion, which is an output of the emotion estimation model after inputting, to the emotion estimation model of the user who is identified by user identification information, the acquired index value of the facial expression score of each facial expression of the user.

10. An emotion estimation device for estimating an emotion of a user, the emotion estimation device comprising:
at least one processor;
at least one non-transitory memory storage device; and
an emotion estimation unit estimating the emotion of the user as an emotion associated with an index value of each facial expression of the user during a period including consecutive events, wherein the estimation is based on a correspondence between:
(A) the index value which is one of (i) a facial expression score of the facial expression of the user between the consecutive events, and (ii) a feature amount related to a change of such facial expression score, and
(B) the emotion correlated with the consecutive events;
an emotion estimation model that is trained by using, as teacher data, (A) an index value of each facial expression of the user between the consecutive events, and (B) a value indicating an emotion that is correlated with the consecutive events, and
the emotion estimation unit estimates the emotion of the user based on the value indicating the emotion which is output from the emotion estimation model, after inputting thereto the index value of each facial expression of the user, wherein
(I) the emotion estimation model includes
a first emotion estimation model trained by using, as teacher data, (A) the index value of each facial expression of the user between the consecutive events, and (B) the value indicating the emotion that is correlated with of consecutive events, when a specific event which may reduce the emotion estimation accuracy has not occurred between the consecutive events, and
a second emotion estimation model trained by using, as teacher data, (A) the index value of each facial expression of the user between the consecutive events, and (B) the value indicating the emotion that is correlated with these events, when the specific event has occurred between the consecutive events, and
(II) the emotion estimation unit estimates the emotion of the user
as a one based on the value indicating the emotion which is output from the first emotion estimation model after inputting thereto the index value of each facial expression of the user acquired when the specific event has not occurred, and
as the one based on the value indicating the emotion which is output from the second emotion estimation model by inputting thereto the index value of each facial expression of the user acquired when the specific event has occurred.

11. The emotion estimation device according to claim 10, wherein
the emotion estimation model is prepared for each user, and
the emotion estimation unit estimates the emotion of the user based on a value indicating an emotion, which is an output of the emotion estimation model after inputting, to the emotion estimation model of the user who is identified by user identification information, the acquired index value of the facial expression score of each facial expression of the user.

* * * * *